US011609328B2

(12) United States Patent
Satat et al.

(10) Patent No.: US 11,609,328 B2
(45) Date of Patent: *Mar. 21, 2023

(54) METHODS AND APPARATUS FOR IMPROVED IMAGING THROUGH SCATTERING MEDIA

(71) Applicant: Massachusetts Institute of Technology, Cambridge, MA (US)

(72) Inventors: Guy Satat, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 981 days.

This patent is subject to a terminal disclaimer.

(21) Appl. No.: 16/411,951

(22) Filed: May 14, 2019

(65) Prior Publication Data

US 2019/0361099 A1 Nov. 28, 2019

Related U.S. Application Data

(60) Provisional application No. 62/675,361, filed on May 23, 2018.

(51) Int. Cl.
*G01S 17/18* (2020.01)
*G01S 7/487* (2006.01)
(Continued)

(52) U.S. Cl.
CPC ............ *G01S 17/18* (2020.01); *G01S 7/4808* (2013.01); *G01S 7/4865* (2013.01);
(Continued)

(58) Field of Classification Search
CPC .......... G01S 17/18; G01S 17/26; G01S 17/89; G01S 7/4808; G01S 7/4865; G01S 7/4876

See application file for complete search history.

(56) References Cited

U.S. PATENT DOCUMENTS

| 4,920,412 A | 4/1990 | Gerdt et al. |
| 5,202,692 A | 4/1993 | Huguenin et al. |
| 9,197,789 B2 | 11/2015 | Mukhopadhyay et al. |
| 9,538,113 B2 | 1/2017 | Grauer et al. |
| 9,973,696 B1* | 5/2018 | Meier ................... H04N 9/646 |
| 10,752,158 B2* | 8/2020 | Satat ................... B60Q 1/0023 |

(Continued)

OTHER PUBLICATIONS

Yu Li, Shaodi You, Michael S. Brown, Robby T. Tan, (2017) "Haze visibility enhancement: A Survey and quantitative benchmarking", Computer Vision and Image Understanding, vol. 165, pp. 1-16 (Year: 2017).*

(Continued)

*Primary Examiner* — Isam A Alsomiri
*Assistant Examiner* — Joseph C Fritchman
(74) *Attorney, Agent, or Firm* — Daly, Crowley, Mofford & Durkee LLP

(57) ABSTRACT

A light source may illuminate a scene that is obscured by fog. Light may reflect back to a time-resolved light sensor. For instance, the light sensor may comprise avalanche photodiodes that are not single-photon sensitive. The light sensor may perform a raster scan. The imaging system may determine reflectance and depth of the fog-obscured target. The imaging system may perform a probabilistic algorithm that exploits the fact that times of arrival of photons reflected from fog have a Gamma distribution that is different than the Gaussian distribution of times of arrival of photons reflected from the target. The imaging system may adjust frame rate locally depending on local density of fog, as indicated by a local Gamma distribution determined in a prior step. The imaging system may perform one or more of spatial regularization, temporal regularization, and deblurring.

20 Claims, 7 Drawing Sheets

(51) Int. Cl.
G01S 17/89 (2020.01)
G01S 7/4865 (2020.01)
G01S 7/48 (2006.01)
G01S 17/26 (2020.01)

(52) U.S. Cl.
CPC ............ *G01S 7/4876* (2013.01); *G01S 17/26* (2020.01); *G01S 17/89* (2013.01)

(56) References Cited

U.S. PATENT DOCUMENTS

| | | | | |
|---|---|---|---|---|
| 2018/0059221 A1* | 3/2018 | Slobodyanyuk | ...... | G01S 7/4814 |
| 2018/0284226 A1* | 10/2018 | LaChapelle | ............. | G01S 7/003 |
| 2019/0122378 A1* | 4/2019 | Aswin | .................. | G06V 10/462 |
| 2019/0130182 A1* | 5/2019 | Zang | .................... | G06V 20/182 |
| 2021/0025980 A1* | 1/2021 | Ohki | ........................ | G01S 7/487 |

OTHER PUBLICATIONS

Rasshofer, R. H., Spies, M., Spies, H., 2011, "Influences of weather phenomena on automotive laser radar systems", Adv. Radio Sci., 9, 49-60 (Year: 2011).*

Wikipedia, "Gamma distribution", https://en.wikipedia.org/wiki/Gamma_distribution (Year: 2022).*

David, O., et al., Range gated active night vision system for automobiles; published in Applied Optics, vol. 45, Issue 28, pp. 7248-7254, Oct. 2006.

Holodovsky, V., et al., In-situ multi-view multi-scattering stochastic tomography; published in 2016 IEEE International Conference on Computational Photography (ICCP), May 2016.

Kadambi, A., et al., Occluded Imaging with Time-of-Flight Sensors, published in ACM Transactions on Graphics (TOG), vol. 35, Issue 2, Article No. 15, ACM New York, NY, USA, May 2016.

Levis, A., et al., Airborne Three-Dimensional Cloud Tomography; published in 2015 IEEE International Conference on Computer Vision (ICCV), Dec. 2015.

Satat, G., et al., All Photons Imaging Through Volumetric Scattering; published in Scientific Reports, vol. 6, Article No. 33946 (2016).

Schilling, B., et al., Multiple-return laser radar for three-dimensional imaging through obscurations; published in Applied Optics, vol. 41, Issue 15, pp. 2791-2799, May 2002.

Minka, T., Estimating a gamma distribution; Microsoft Research, Cambridge, UK, Tech. Rep., 2002.

* cited by examiner

METHODS AND APPARATUS FOR IMPROVED IMAGING THROUGH SCATTERING MEDIA

RELATED APPLICATIONS

This application claims the benefit of U.S. Provisional Application No. 62/675,361 filed May 23, 2018 (the "Provisional").

FIELD OF TECHNOLOGY

The present invention relates generally to imaging through scattering media.

BACKGROUND

Radar and time-gating are two conventional technologies that are employed for imaging through fog.

Radar may employ radio waves with long wavelengths at which fog is transparent. However, the long wavelengths may cause the radar to have spatial resolution that is so poor that it is hard or even impossible to classify objects, and the use cases may be limited to detection. Furthermore, at these long wavelengths, the optical contrast of the radar may be so poor that it is only possible to measure bulk properties of materials, and impossible for example to identify road lane marks and read road signs.

Time gating may image a far-away object through fog. To do so, time-gated measurements may be taken of visible light reflecting from a foggy scene. However, conventional time gating requires long integration times and prior knowledge of the scene depth map. Furthermore, conventional time gating: (a) rejects photons that are outside of the time gate (e.g., later arriving scattered photons, which contain useful information); and (b) within the time gate, cannot distinguish between light reflecting from the fog and light reflecting from the target. As a result, conventional time gating operates at a low signal-to-noise ratio (SNR).

SUMMARY

In illustrative implementations of this invention, an system images through fog, in such a way as to solve or mitigate each of these problems.

In illustrative implementations, the system recovers reflectance and depth of a scene occluded by dense, dynamic, and heterogeneous fog.

In some cases, a light source (e.g., a pulsed laser) illuminates a foggy scene. Light reflects back to a time-resolved light sensor from or through the fog. Some photons that arrive at the light sensor reflect from a target object which is being imaged. Other photons that arrive at the light sensor reflect from the fog itself without ever interacting with the target object.

In some cases, a computer performs a probabilistic algorithm to estimate fog parameters from the light sensor measurements without any calibration or prior knowledge of the specific scene depth map. The probabilistic algorithm may exploit the fact that times of arrival of photons reflected from the fog itself have a distribution (Gamma) that is different than the distribution (Gaussian) of times of arrival of photons reflected from the target object. Alternatively, the probabilistic algorithm may exploit the fact that measured irradiance (as a function of time) of light reflected from the fog itself has a distribution (Gamma) that is different than the distribution (Gaussian) of intensity (as a function of time) of light reflected from the target object.

The probabilistic algorithm may accurately estimate reflectance and depth of the target, even through dense fog, without prior knowledge of the specific fog or the depth map of the specific scene.

The probabilistic algorithm may take into account times of arrival of all classes of measured photons (including scattered and un-scattered photons), in order to estimate fog properties and to computationally reject the fog from the measurement. Alternatively, the probabilistic algorithm may take into account irradiance due to of all classes of measured photons (including scattered and un-scattered photons), in order to estimate fog properties and to computationally reject the fog from the measurement.

Using all of the optical signal (including scattered, un-scattered, background and signal photons) improves resolution and SNR (signal-to-noise ratio) because all of the photons provide information about the target, the fog, or both. For instance, some scattered photons: (a) reflect from the target but scatter before reaching the detector; and (b) provide information about both the target and the fog. Other scattered photons: (a) reflect from the fog without ever interacting with the target; and (b) provide information about the fog. Yet other photons: (a) reflect from the target and are never scattered by the fog; and (b) provide information about the target.

Using all types of measured photons (in the present invention) is quite different than conventional time gating. In conventional time gating, photons that arrive during a narrow time-gate are taken into account and all other photons are disregarded. In conventional time-gating: (a) background photons that arrive during the time gate may cause the measurements to be inaccurate; and (b) photons that arrive outside the time gate are completely disregarded and thus information about the fog is lost. In contrast, in the present invention: (a) both early arriving ballistic photons and later-arriving scattered photons are counted; and (b) data from the scattered photons provides information about the fog that is employed to computationally separate the reflections from the fog and the reflections from the target. (Ballistic photons are photons that reflect from the target and travel to the detector without scattering.)

In some cases: (a) the light sensor comprises a single-photon avalanche detector (SPAD) camera; and (b) each pixel of the SPAD camera detects only one photon during each frame. Alternatively, in some cases, the light sensor is not single-photon-sensitive. For instance, the light sensor may comprise one or more avalanche photodiodes (APDs) and may include high speed sampling hardware.

In some implementations, reflected light is measured pixel-by-pixel and the probabilistic algorithm is performed pixel-by-pixel. This pixelwise sensing and pixelwise computation is well-suited to handle heterogenous fog, i.e., a fog whose optical density varies as a function of spatial position.

Alternatively, in some cases, spatial statistics of the fog and of the target being imaged are leveraged to improve scene reconstruction. This approach may leverage the fact that many features of a foggy scene are typically smooth or at least piecewise smooth functions of spatial position.

For instance, reflectance and depth of a scene typically approximate a piecewise smooth function of spatial position. Likewise, the Gamma distribution of time of arrival of background photons reflecting from a fog typically approximates a piecewise smooth function of spatial position.

Likewise, in some implementations, information from preceding measurements may be employed, to improve scene reconstruction or to reduce the amount of time needed for measurements. This approach—which uses data from the most recent prior step to adjust the next step—may leverage the fact that many features of a foggy scene are typically smooth or at least piecewise smooth functions of time. For instance: (a) reflectance and depth of a scene, at a given pixel or local area of pixels, typically approximate a piecewise smooth function of time; and (b) thus reflectance and depth, for a given pixel or local area of pixels, are usually similar in two successive steps (e.g., in the most recent step and the next step). Likewise: (a) the Gamma distribution of time of arrival of background photons reflecting from a fog typically approximates a piecewise smooth function of time; and (b) thus the Gamma distribution parameters, for a given pixel or local area of pixels, are usually similar in two successive steps (e.g., in the most recent step and the next step).

In some cases, spatial and/or temporal regularization is employed to improve reconstruction of scene. The regularization may leverage local piecewise smooth priors. The smooth priors (e.g., Gamma distribution parameters) may be spatially smooth or temporally smooth.

In some cases, the effective acquisition time (and number of frames in a reconstruction window) are fixed.

Alternatively, in some cases (e.g., with a single-photon-sensitive imaging sensor): (a) the effective acquisition time (and number of frames in a reconstruction window) are dynamically and repeatedly adjusted locally or pixelwise, based on local estimated optical thickness of the fog; and (b) the denser the fog, the longer the effective acquisition time and the more frames in the reconstruction window. The local optical thickness of fog may be estimated from local Gamma parameters. Increasing the effective acquisition time tends to increase the total number of counted photons used to reconstruct depth and reflectance.

Alternatively, in some cases (e.g., with an imaging sensor that is not single-photon-sensitive): (a) hardware exposure time (duration of a frame) is dynamically and repeatedly adjusted locally or pixelwise, based on local estimated optical thickness of the fog; and (b) the denser the fog, the longer the hardware exposure time. Again, the local optical thickness of fog may be estimated from local Gamma parameters. Increasing the hardware exposure time tends to increase the total measured photons used to reconstruct depth and reflectance.

In some implementations: (a) one or more computers perform an algorithm that computationally extracts, from the total measurements of reflected light, the signal that is due to the signal photons that interacted with the target object; and (b) thus this algorithm may be considered to be, in at least some aspects, a deblurring algorithm.

In some cases, one or computers perform additional deblurring steps. These additional deblurring steps may include solving a blind deconvolution problem in which the blur kernel is estimated from the estimated signal itself In some implementations of this invention, an expectation maximization (EM) algorithm is performed, to further improve the scene reconstruction. Parameters of the fog and/or target may be employed as initializers for the EM algorithm.

In some implementations, the light source illuminates the foggy scene with structured illumination. Information encoded by the structured illumination may be employed to facilitate scene reconstruction.

In some cases, after a reflectance image of the scene is calculated, a computer vision algorithm is employed to recognize objects or patterns in the foggy scene. For instance, optical character recognition (OCR) may be employed to recognize text characters (e.g., letters, words, or symbols) that are displayed on an object (e.g., street sign) that is occluded by fog.

In some implementations, the light sensor has a time resolution that is sufficiently fast to image a dynamically changing foggy scene. For instance, the light sensor may have a fast time resolution that enables the system to accurately measure reflectance and depth of a target, even though the target, the fog or both are dynamically changing over time.

In some cases, the system operates in reflection mode. That is, the light sensor may measure photons of light that reflect from a scene that is wholly or partially obscured by the fog or that reflect from the fog itself.

In some cases: (a) a target object is partially or wholly obscured by fog (to the unaided human eye); and (b) despite the fog, an imaging system accurately measures both reflectance and depth of the target object. To do so, a light sensor may capture time-resolved measurements of light reflecting from the foggy scene. A probabilistic algorithm may be employed to estimate the properties of the back reflection from the fog. The back reflection may be subtracted from the total measured photons to recover the signal from the target and may be processed to determine, on a pixel-by-pixel basis: (a) reflectance of a target, and (b) a depth map of the target.

In some cases, the system has a large field of view. In some use scenarios, the system images through dense fog or other highly turbid scattering media. For instance, in some use scenarios, the system accurately measures reflectance and depth of a target even though tens or hundreds of scattering events occur before a scattered photon reaches the detector.

This invention has many practical applications. For instance, this invention may accurately recover, through dense fog, an image and depth map of an object. Among other things, this ability to image through dense fog: (a) may enable self-driving cars to operate in foggy weather; (b) may be employed to augment a human driver's vision in foggy weather, by providing a heads-up-display or audio cues that alert the driver to occluded objects and that read road signs; (c) may be employed by aircraft (e.g., drones, airplanes, and helicopters) to detect obstacles during low-level flight through fog; (d) may facilitate airborne imaging of objects obscured by fog (e.g., drone imaging of objects on the ground that are hidden by fog); (e) may enable trains to maintain speed in foggy weather; and (f) may be employed by watercraft (e.g., naval vessels) to detect obstacles while navigating in foggy weather.

In illustrative implementations, a light sensor captures time-resolved measurements of light reflecting from a foggy scene. One or more computers may take these time-resolved measurements as inputs, and may computationally separate (a) background light (reflection from the fog itself) and (b) signal light (reflection from the target).

In some cases, a computer estimates target depth and reflectance. To do so, the computer may perform an algorithm that includes: (a) time profile estimation; (b) background distribution estimation, (c) signal estimation; and (d) target recovery.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

In FIG. 3, the number of frames is fixed. In FIG. 5, the light sensor is not single-photon-sensitive. In FIG. 6, the method includes regularization steps.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

Figure 1:
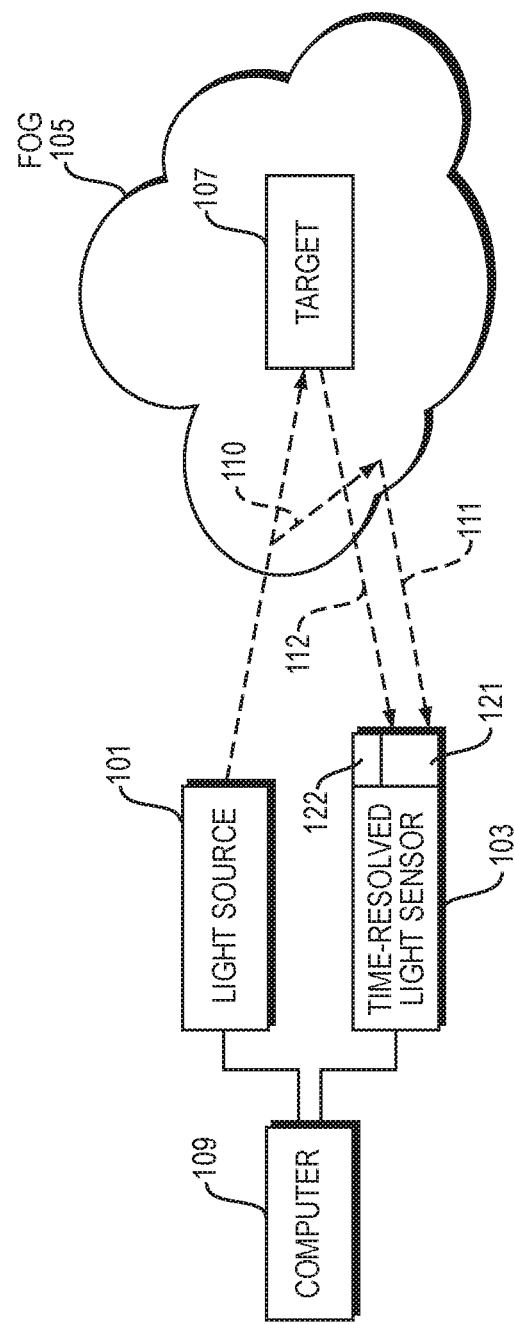
FIG. 1 shows hardware of an imaging system.

FIG. 1 shows hardware of an imaging system, in an illustrative implementation of this invention. In FIG. 1, a light source 101 (e.g., a laser) emits light (e.g., pulsed light) to illuminate a foggy scene. The foggy scene includes a target object 107 and fog 105. Photons reflect from the foggy scene and travel to a time-resolved light sensor 103. For instance, in some cases: (a) light sensor 103 is a SPAD light sensor; and (b) each pixel of light sensor 103 detects only one photon during each frame. In some other cases, light sensor 103 is an APD (avalanche photodiode) light sensor. In some cases, one or more actuators 122 actuate rotation of one or more mirrors 121 along one or more axes of rotation. In some case, light sensor 103 performs a raster scan of the foggy scene, while (a) one or more actuators 122 actuate rotation of one or more mirrors 121 and (b) the one or more mirrors 121 steer reflected light from the scene to light sensor 103. Light sensor 103 may comprise a single hardware pixel or may comprise multiple hardware pixels. If raster scanning is performed, then: (a) light sensor 103 may capture an image; and (b) the number of image pixels in the image may be much greater than the number of hardware pixels in light sensor 103.

A portion of the measured photons are what we call "signal photons"—that is, photons that have interacted with target 107. For instance, some of the signal photons reflect from target 107 and travel to light sensor 103 via path 112. Other signal photons reflect from target 107 and scatter before reaching light sensor 103.

Another portion of the measured photons are what we call "background photons"—that is, photons that have reflected from the fog itself and that have not interacted with target 107. For instance, some of the background photons may reflect from the fog via paths 110 and 111, without interacting with target 107. A computer 109 may perform a probabilistic algorithm that: (a) takes the light sensor measurements as input; (b) computationally separates the background reflection (from the fog itself) and the reflection from the target; and (c) calculates reflectance and a depth map of the target. The probabilistic algorithm may leverage the fact that times of arrival of photons reflected from fog itself have a distribution (Gamma) that is different than the distribution (Gaussian) of times of arrival of photons reflected from objects occluded by fog. Alternatively, the probabilistic algorithm may leverage the fact that measured intensity (as a function of time) of light reflected from the fog itself has a distribution (Gamma) that is different than the distribution (Gaussian) of intensity (as a function of time) of light reflected from the target object.

Figure 2:
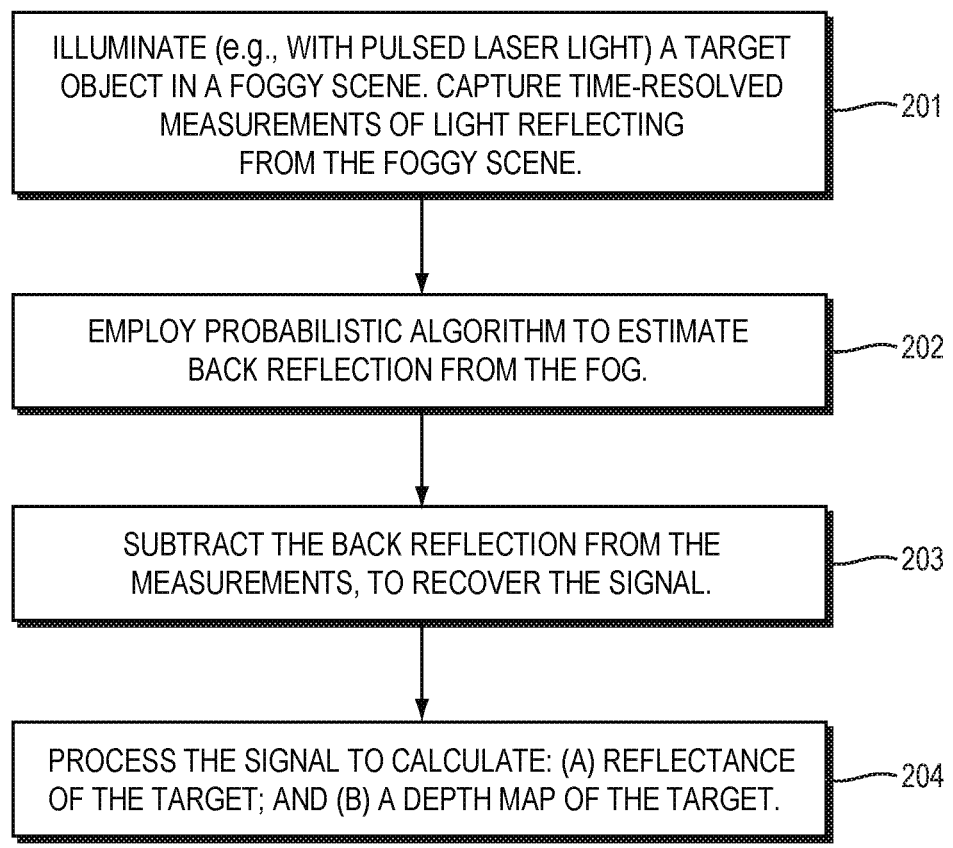
FIGS. 2, 3, 5 and 6 are each a flowchart of a method of imaging reflected light from a foggy scene.
Figure 3:
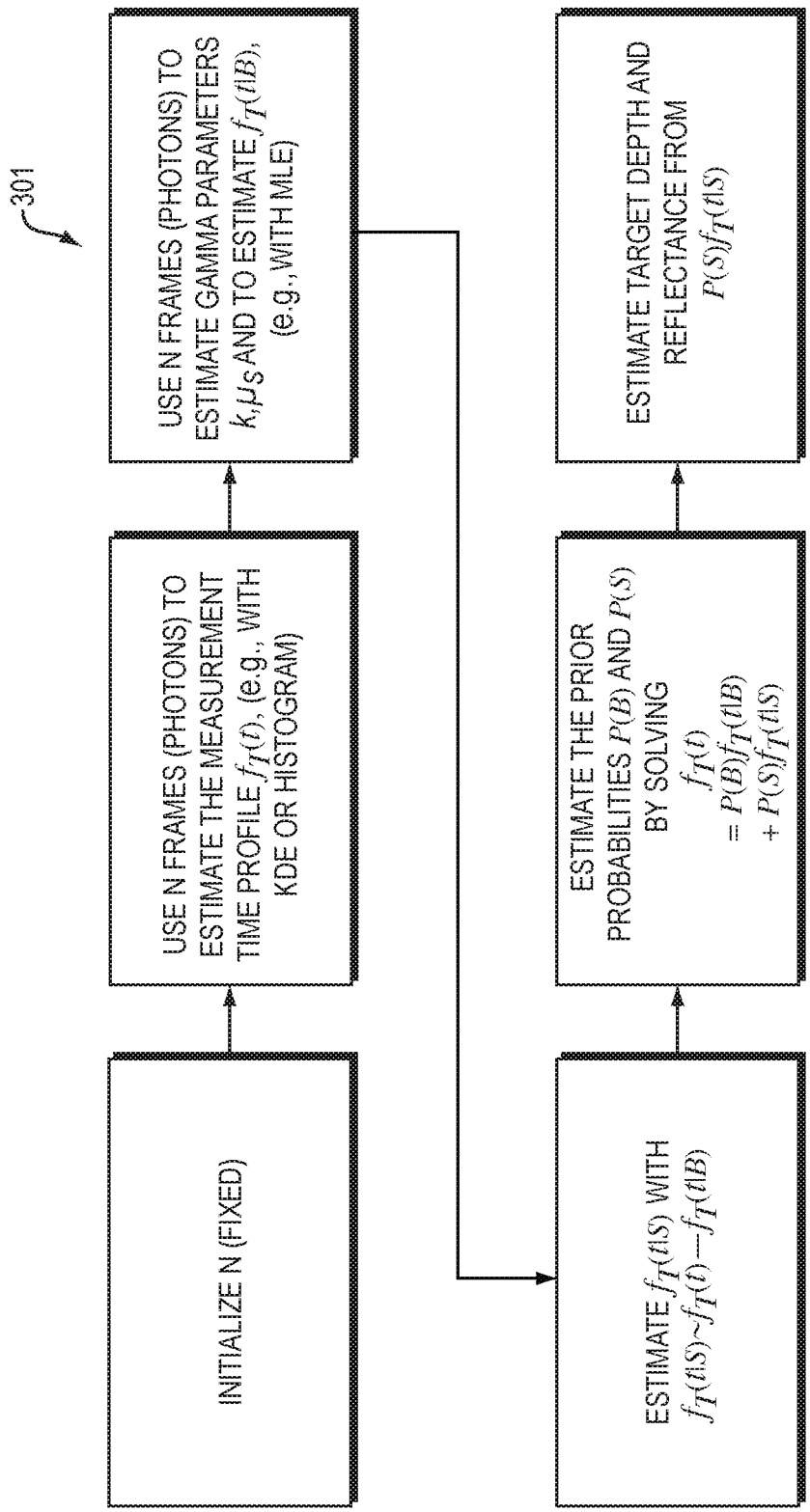

FIGS. 2 and 3 are each a flowchart of a method of imaging reflected light from a foggy scene.

The method shown in FIG. 2 includes at least the following steps: Illuminate (e.g., with pulsed laser light) a target object in a foggy scene. Capture time-resolved measurements of light reflecting from the foggy scene (Step 201). Employ a probabilistic algorithm to estimate back reflection from the fog (Step 202). Subtract the back reflection from the measurements, to recover the signal (Step 203). Process the signal to calculate: (a) reflectance of the target; and (b) a depth map of the target (Step 204).

In FIG. 3, an algorithm 301 determines target depth and reflectance.

Probabilistic Model

The following 15 paragraphs describe a probabilistic model of photons that have reflected from a foggy scene.

This model may be employed to model reflected light from a foggy scene, in the following physical setup: A pulsed light source may emit photons into a foggy scene. A time-resolved camera may be located adjacent to the light source. Each pixel in the camera may detect time of arrival of individual photons as they arrive at the sensor, after reflecting from the fog itself or from a target in the foggy scene. For each measurement frame, each pixel of the camera may detect the time of arrival of the first detected photon (if any) at that pixel during the frame.

In this model, a measured photon may be classified as either (a) a background photon, (b) a signal photon, or (c) a dark count photon.

A background photon is a photon that did not interact with the target (i.e. did not interact with the object being imaged). Thus, a background photon may provide information about only the fog. Due to scattering dynamics, background photons may arrive at different times.

A signal photon is a photon that interacted with the target. Thus, a signal photon may provide information about target reflectivity and depth.

Dark count photons may be measured due to dark current that flows in the detector even when no actual photons are entering the detector. The dark count photons may be uniformly distributed in time. In illustrative implementations, the dark count rate in the detector is at least an order of magnitude less than the background and signal counts in the measurements, and thus may be disregarded in the model.

We now explain a probabilistic model of these photon classes, in some implementations of this invention. In some cases, this model is pixelwise.

In this model: (a) the detector is single photon sensitive; and (b) measurement per pixel is a list of photons' times of arrival. For each photon, the time of arrival of the photon encodes information regarding the probability that the photon is a background photon and the probability that the photon is a signal photon. As discussed in more detail below, background and signal photons have different statistics in time.

In this model, the overall probability density function $f_T(t)$ of detecting a photon is:

$$f_T(t)=f_T(t|S)P_S+f_T(t|B)P_B \quad \text{(Eq. 1.1)}$$

where (a) t is time of arrival, (b) $P_S$ is the probability that a photon is a signal photon; (c) $P_B$ is the probability that a photon is a background photon; (d) $f_T(t|S)$ is the probability density function of the time of arrival of a signal photon; and (e) $f_T(t|B)$ is the probability density function of the time of arrival of a background photon.

Background Photon Statistics: The distance that a photon (which is propagating through a scattering medium such as fog) propagates between consecutive scattering events may be exponentially distributed with a mean of $1/\mu_s$. Equivalently the time between scattering events may be exponentially distributed with a mean of $1/c\mu_s$ (where c is the speed of light). In this discussion, for simpler notation, we set c=1. In that case, the time between scattering events k−1 and k denoted by $\tau_k$ has the following probability density function:

$$f_{\tau_k}(t) = \mu_s e^{-\mu_s t} \quad \text{(Eq. 1.2)}$$

Since the scattering events are independent, so are the different times $\tau_k$. In this model, a detected photon undergoes multiple scattering events such that the detection time is $T = \Sigma_{k=1}^{K} \tau_k$, where K is the number of scattering events that a photon undergoes before detection. The sum of independent exponential random variables is Gamma distributed T~GAMMA(K,$\mu_s$), where K and $\mu_s$ are the shape and rate parameters, respectively. (In this model, the number of scattering events K that a photon undergoes before detection is approximately equal to the shape parameter K of the Gamma distribution). As used herein, unless the context clearly indicates otherwise, K is the shape parameter of the Gamma distribution.

In this model, the probability density function of the time of arrival of a background photon is:

$$f_T(t|B) = \frac{\mu_s^K}{\Gamma(K)} t^{(K-1)} \exp\{-\mu_s t\} \quad \text{(Eq. 1.3)}$$

where t is time of arrival, $\Gamma(K)$ is the Gamma function, and the shape and rate parameters (K and $\mu_s$ respectively) encode the physical properties of the fog.

Signal Photon Statistics: Next, we model signal photons (i.e., photons that interacted with the target). In this model, the time of arrival (at the detector) of signal photons is a Gamma distributed random variable. However, in practice, a Gaussian distribution may be employed to model the signal functions. Using a Gaussian distribution to model the signal photons may be justified because: (a) the number of scattering events is large; and (b) when the shape parameter, K, of a Gamma distribution is large it resembles a Gaussian distribution. The Gaussian distribution mean, $\mu$, corresponds to the depth of the object, and the variance, $\sigma^2$, encodes the time dynamics these photons undergo. In some cases, the majority of the contribution to $\sigma^2$ is due to system time jitter.

In this model, the probability density function of time of arrival of a signal photon is:

$$f_T(t|S) = \frac{1}{\sqrt{2\pi\sigma^2}} \exp\left\{-\left(\frac{t-\mu}{\sigma}\right)^2\right\} \quad \text{(Eq. 1.4)}$$

where t is time of arrival and $\pi$ is Archimedes' constant.

In many use scenarios, there are many more background photons than signal photons.

In Equations 1.1, 1.3, 1.4, 1.8, and 1.9, the subscript T indicates that the function in question is a time-domain function.

The probabilistic model (and the physical phenomena) described in the preceding 15 paragraphs are non-limiting examples. This invention may be implemented in many other ways (e.g., by employing a different model).

Imaging Through Dense Fog

In some cases, Equation 1.1 provides a pixelwise model of the complete time profile of the signal photons and background photons. In some cases, the six terms in Equation 1.1 are estimated from raw measurements of photons' times of arrival. The estimation pipeline may comprise four steps: (1) complete time profile estimation, (2) background distribution estimation, (3) signal distribution estimation, and (4) priors estimation.

In some cases, input per pixel is a list of photons' detection times within a fixed exposure window. For instance, in some cases: (a) pulsed light and a SPAD detector are employed; (b) for each emitted pulse, the SPAD camera may (or not) detect a photon per pixel; (c) the arrival time is the time between pulse emission and photon detection (taken in picoseconds); and (d) each pixel of the SPAD camera detects only one photon during each frame. Multiple arrival times per pixel may be used to estimate the model.

Estimating Time Profile (General)

In some cases, a complete time profile is estimated. This complete time profile is a pixelwise probability density function $f_T(t)$ of the time of arrival of all measured photons, including all measured background photons and all measured signal photons. In $f_T(t)$, is time.

A kernel density estimator (KDE) may be employed to map the individual photon detection events to $f_T(t)$. This estimated complete time distribution (i.e., estimate of $f_T(t)$) is denoted by $\widehat{f_T}(t)$. KDE has several advantages as opposed to a traditional histogram. Among other things: (a) there is no need to specify a bin size for KDE; and (b) KDE performs well in cases of a few sampling points (such as may occur here). In some cases, KDE bandwidth may be automatically selected. Alternatively, KDE bandwidth may be heuristically selected. For instance, in a prototype of this invention, KDE bandwidth is set as 80 ps, which matches the FWHM (full width at half maximum) of the time response curve for the prototype's SPAD camera.

Estimating Background Time Dynamics

As noted above, the time of arrival (at the detector) of background photons may be modeled as a Gamma distributed random variable. The distribution parameters of the Gamma distribution may be estimated by MLE (maximum likelihood estimation). The estimated Gamma distribution is denoted by $\widehat{f_T}(t|B)$.

In many use scenarios, the background light (reflected from the fog itself) is much stronger than the signal light (reflected from the target). Thus, in many use scenarios, $P_B \approx 1$, and the raw photon counts may be used to estimate the parameters in $f_T(t|B)$. Specifically, in many use scenarios, the majority of the photons are background photons, and thus: (a) all measured photons may be taken into account when estimating $f_T(t|B)$; and (b) the signal photons may effectively be treated as noise when estimating $f_T(t|B)$. When there is less fog, this assumption ($P_B \approx 1$) may not be valid. But even if this assumption is not valid, the remainder of the pipeline accounts for the errors introduced by this step.

For the maximum likelihood estimator, an iterative algorithm may estimate K, with the following update rule:

$$\frac{1}{K^{new}} = \frac{1}{K} + \frac{1}{K^2} \frac{\frac{1}{m}\sum_{i=1}^{m} \log x^i - \log\left(\frac{1}{m}\sum_{i=1}^{m} x^i\right) - \Psi(K) + \log(K)}{\frac{1}{K} - \Psi'(K)} \quad \text{(Eq. 1.5)}$$

where m is the number of detected photons per pixel, $x^i$ is the i-th photon arrival time, $\Psi$ is digamma function, and $\Psi'$ is the first derivative of the digamma function.

Equation 1.5 may be iterated repeatedly (e.g., five times). The iterations may be initialized with:

$$K^0 = \frac{0.5}{\frac{1}{m}\sum_{i=1}^{m} \log x^i - \log\left(\frac{1}{m}\sum_{i=1}^{m} x^i\right)} \quad \text{(Eq. 1.6)}$$

The estimated K may be used to estimate $\mu_s$ according to:

$$\hat{\mu}_s = \frac{1}{\hat{K}} \frac{1}{m} \sum_{i=1}^{m} x^i \quad \text{(Eq. 1.7)}$$

Estimating Signal Time Dynamics

In some cases, $f_T(t|S)$ is estimated by subtracting $f_T(t|B)$ from $f_T(t)$ and then fitting (or robustly fitting) the difference to a Gaussian distribution. Put differently, $f_T(t)-f_T(t|B)$ may be fitted (or robustly fitted) to a Gaussian distribution that estimates the signal $\widehat{f_T}(t|S)$.

Here is why this subtraction is performed in this step: In many use scenarios (such as a dense fog), $P_B \gg P_S$, that is, a measured photon is much more likely to be a background photon than a signal photon. To estimate the signal from the target, we may at this step (estimating $f_T(t|S)$) assume that $P_B \approx 1$. If we divide Equation 1.1 by $P_B \approx 1$ and rearrange terms, we find that $f_T(t|S) \approx f_T(t)-f_T(t|B)$.

Negative values in the subtraction above may be set to zero.

In some cases, in this step (estimating $f_T(t|S)$), the functions $f_T(t|S)$, $f_T(t|B)$, and $f_T(t)$ are no longer treated as probability densities. This may be done to achieve a robust estimator.

Estimating Priors $P_S$, $P_B$

With the background and signal estimated distributions, the parameters $P_S$ and $P_B$ may be estimated by solving:

$$[\widehat{P_S}, \widehat{P_B}] = \underset{0 \leq P_S, P_B \leq 1}{\operatorname{argmin}} \sum_t (P_S \widehat{f_T}(t|S) + P_B \widehat{f_T}(t|B) - \widehat{f_T}(t))^2 \quad \text{(Eq. 1.8)}$$

If there is no fog, then $\widehat{P_B}$ approaches zero. If there is no target (from which signal photons reflect), then $\widehat{P_S}$ approaches zero. The solution to Equation 1.8 may be a least squares. Alternatively, solving Equation 1.8 may leverage prior information regarding $P_S$ and $P_B$.

Back to Photon Counts

In some cases, estimators are mapped to actual photon counts N(t), the number of photons measured at time bin t, by computing a normalization factor $\hat{\alpha}$ such that $$\sum_t N(t) = \hat{\alpha} \sum_t \left(\hat{P}_S \widehat{f_T}(t|S) + \hat{P}_B \widehat{f_T}(t|B)\right).$$

This step is desirable, to achieve consistent results across pixels that receive a different number of photons. The estimated model is:

$$\widehat{N}(t) = \hat{\alpha}(\hat{P}_S \widehat{f_T}(t|S) + \hat{P}_B \widehat{f_T}(t|B)) \quad \text{(Eq. 1.9)}$$

Target Depth and Reflectance Recovery

In illustrative implementations, the properties of the target are encoded by the signal part of Equation 1.9. Substituting the right side of Equation 1.4 for $\widehat{f_T}(t|S)$ in the signal part of Equation 1.9, we have:

$$\widehat{N}_S(t) = \hat{\alpha} \hat{P}_S \frac{1}{\sqrt{2\pi\hat{\sigma}^2}} \exp\left\{-\frac{(t-\hat{\mu})^2}{2\hat{\sigma}^2}\right\} \quad \text{(Eq. 1.10)}$$

Depth Estimation:

In some cases, the target depth is encoded in the early part of the Gaussian distribution. The early part of the Gaussian distribution corresponds to ballistic photons (i.e., signal photons that traveled directly to the detector without any scattering and thus arrived earlier than photons that scattered while traveling to the detector). In some cases, the estimated Gaussian variances are in the order of 1-2 time bins, due to both scattering and measurement jitter.

In some cases: (a) the depth, at a given pixel or local region of pixels, of the target being imaged is estimated as being equal to $\hat{\mu}$ (i.e., the mean of the estimated Gaussian distribution for the pixel); and (b) $\hat{\mu}$ is a robust estimate of the target depth.

In some cases, the Gaussian distribution for a pixel is fitted regardless of whether there is a reflection of the target at the pixel. However, the reflectance estimation may be employed as a confidence map to reject pixels where no target exists.

Reflectance Estimation:

In some cases, the reflectance value per pixel is captured by the coefficients of Equation 1.10 that are not time-dependent. That is, for a given pixel, $$R = \hat{\alpha} \hat{P}_S \frac{1}{\sqrt{2\pi\hat{\sigma}^2}},$$

where R is reflectance. In some cases, including the variance dependent normalization factor $$\left(\text{i.e., } \frac{1}{\sqrt{2\pi\hat{\sigma}^2}}\right)$$

in Equation 1.10 provides cleaner results (e.g., better PSNR and better score on SSIM index). In some cases, the reflectance estimation is further refined by multiplying the reflectance for each pixel by the square of the estimated depth for that pixel (to account for the one over depth squared drop-off).

Refinement of Reflectance Estimation:

In a use scenario with low fog, the reflectance intensity profile may be governed by the illumination intensity profile. (For instance, if a flashlight illuminates a low density fog, it may create a brightly lit circular area of the fog, and light reflecting from the fog may be most intense in a circular region of the sensor, which circular sensor region corresponds to the brightly illuminated circular region of the fog. In contrast, in a dense fog, the reflectance intensity profile may be affected only slightly or not at all by the illumination intensity profile. This is because the reflected light is scattered to a great extent by the dense fog.)

To handle use scenarios with low density fog (where the reflectance intensity profile is governed by the illumination intensity profile), one or more intensity calibration measurements may be performed. In some implementations, the illumination intensity profile is accounted for only when estimated optical thickness ($\widehat{OT}$) of the fog is less than 1. (Optical thickness estimates are discussed in more detail below). To create a smooth transition, a linear interpolation may be employed. This linear interpolation may be based on the estimated optical thickness between 0 to 1. In some cases: (a) when $\widehat{OT}=0$ the illumination intensity profile is completely accounted for; and (b) when $\widehat{OT} \geq 1$ the illumination intensity profile is ignored.

For instance, a reflectance intensity profile R may be element-wise multiplied by an adaptative calibration map C. The result of this element-wise multiplication (R*C) may be a refined version of the reflectance intensity profile, which has been refined by mitigating or eliminating the effect of the illumination intensity profile.

For instance, an adaptive calibration map C may be calculated, based on the illumination intensity profile I as follows:

if $OT<1$: $C=((1-OT)/I)+((OT)*1)$ else: $C=1$

In the preceding equation, if OT=0, then C=1/I and R*C is equal to R/I. By dividing R by I, the effect of the illuminate intensity profile on the reflectance intensity profile is eliminated—or put differently, the illumination intensity profile is fully accounted for. On the other hand, in the preceding sentence, when $OT\geq1$, then C=1, and the illumination intensity profile does not affect the reflectance intensity profile.

However, it is not necessary to set the threshold for optical thickness (OT) equal to 1. Alternatively, any other threshold, g>0, may be used instead of 1, in which case the equation is:

if $OT<g$: $C=((1-OT/g)/I)+(OT/g)$ else: $C=1$

Optical Thickness

As used herein, "optical thickness" of a particular fog at time t means $-\ln(P_t/P_0)$, where $P_0$ is the power of light measured at a light sensor when there is no fog, and $P_t$ is the power of light measured at the light sensor at time t with the particular fog present.

In some cases, optical thickness of fog is estimated as:

$$\widehat{OT} = \theta_1 e^{\theta_2 \hat{K}} \quad \text{(Eq. 1.11)}$$

where (a) $\hat{K}$ is the estimated shape parameter of the Gamma distribution, and (b) $\theta_1$ and $\theta_2$ are two fitting coefficients. Estimating optical thickness of the fog has many practical benefits. For instance, optical thickness of fog may be used to predict visibility, which may in turn be employed to determine maximum speed of a car. Also, estimated optical thickness of fog may be employed to determine the maximum depth at which imaging through fog works well.

Furthermore, as discussed above, the estimate of optical thickness may be used to refine reflectance intensity in the recovered image.

Prototype

The following seven paragraphs describe a prototype of this invention.

In this prototype, a PhotonForce™ PF32 SPAD camera has 32×32 pixels. Each pixel is single photon sensitive and time-tags measured photons with a nominal time resolution of 56 ps. The camera exposure time is set to 100 μs (the PF32 measures the arrival time of the first detected photon per-pixel per-exposure). In this prototype, each reconstruction is based on measurements taken in 20,000 frames. A new reconstruction is produced every 100 μs, while using a sliding window with a history of 2 seconds. For illumination, a SuperK pulsed super-continuum laser is spectrally filtered to a narrow band around 580 nm (the camera is equipped with a similar filter to reject background). The laser repetition rate is 80 MHz with a pulse duration of 5 ps with an average laser's optical power of 0.15 W. The laser light is diffused before entering the chamber and illuminates the scene (albeit with attenuation when fog is present).

In this prototype, the camera and laser are positioned in a reflection mode. That is, the camera and laser are positioned in such a way that light from the laser reflects from the scene back to the camera (rather than passing through the target and then traveling to the camera).

In some use scenarios: (a) this prototype employs an 80 MHz laser repetition rate with a frame exposure time of 100 microseconds and 2000 frames per data point; and (b) each pixel can record up to 1 photon out of 8000 pulses per exposure time.

In some other use scenarios, the SPAD camera has an acquisition period of 2 seconds (with a mean of 2,440 photons per acquisition period).

In this prototype, the measurements of photon arrival times are provided in picoseconds, to achieve numerical stability in parameter estimation. The KDE estimator uses a standard Gaussian kernel with a bandwidth of 80 ps. Negative values in the subtraction of the measured time profile and background are set to zero. To further improve the reconstruction quality of the reflectance map, the reflectance map: (a) is multiplied by μ (i.e., the mean of the reflection map) to amplify points that are further away; and (b) is thresholded to 0.2 of the peak. In this prototype, the threshold used as a confidence map for the depth estimation is 0.2 of the final reflectance map.

In this prototype, the computation time to recover the reflectance and depth per pixel is 0.03 seconds using unoptimized Matlab® code on a 3rd generation Apple® i7 desktop computer.

In a series of tests, this prototype accurately recovered depth and reflectance of a target object occluded by a wide range of realistic fog conditions, such as dense fog (clear visibility to 30 cm visibility), dynamic fog, and heterogeneous fog. For instance, in a particular test, a target object was 57 cm away from the camera and the visibility through the fog was 37 cm. In this test, the prototype recovered depth with a resolution of 1 cm and recovered target reflectance with an improvement of 4 dB in PSNR (peak signal-to-noise ratio) and 3.4× reconstruction quality in SSIM (structural similarity) index over time gating techniques.

The prototype described in the preceding seven paragraphs is a non-limiting example of this invention. This invention may be implemented in many other ways.

Sensitivity to Sensor Time Resolution

In illustrative implementations, the imaging method leverages the fact that background and signal photons have different statistics in time. This allows one to distinguish between them and reject the back reflectance from the fog. As the detector time resolution reduces, this ability diminishes.

In illustrative implementations, the sensor time resolution: (a) is much smaller than the standard deviation of the Gamma distribution of time of arrival of background photons; and (b) is much smaller than the standard deviation of the Gaussian distribution of time of arrival of signal photons. The desirable time resolution (of the sensor) may be a function of the mean time between scattering events, which may be related to the standard deviation of a Gamma distribution.

In some implementations, the light sensor is time-resolved, in the sense that its time resolution is sufficiently fast that the different statistics in time of the background and signal photons are accurately measured. For instance, the time resolution of the time-resolved sensor: (a) may be at least ten times smaller than the standard deviation of the Gamma distribution of time of arrival of background photons; (b) may be the same order of magnitude as the mean time between scattering events (for scattering of light propagating through the fog), that is $1/c\mu_s$; or (c) may be set to achieve a desired depth resolution (since shorter time resolution would result in better depth resolution). In some cases, the time resolution needed to computationally separate the target from the fog decreases as the size of scene increases. This is because the required time resolution may be a function of the scattering distribution standard deviation which becomes larger as scene size increases.

In some cases, the smaller the time resolution, the more accurate the depth resolution. Thus, the main constraint on time resolution may come from a desire for accurate depth resolution.

Variable Scattering of Background Photons

The parametric model described above assumes that the number of scattering events before detection, is a constant parameter similar to $\mu_s$.

In practice, however, the number of scattering events before detection is not a constant, but is instead a random variable that varies from one photon detection to the next.

In some cases, a more accurate approach is employed, which models the probability density function of the time of arrival of background photons as $$f_T(t|B) = \int_{K=1}^{\infty} f_G(K, \mu_s) f_K(K) dK,$$

where $f_G(K,\mu_s)$ is a Gamma distribution and where $f_K(K)$ is the probability density function of time of arrival of a photon undergoing K scattering events before detection.

Turbid or Scattering Media

This invention is not limited to imaging through fog. In some use scenarios, this invention images through any scattering media, including smoke, haze, particulate air pollutants, dust, forest exudates, geyser steam, natural aerosol, manmade aerosol, turbid gas or turbid liquid. In some use scenarios, this invention performs medical imaging through scattering media such as tissue or blood. Each reference herein to fog, however worded, may be replaced by a reference to any or all of these scattering media. For instance, each "foggy scene" (which comprises both fog and a target) that is mentioned herein may instead comprise both a scattering media and a target.

Adaptive Reconstruction Window

In some cases where a single-photon-sensitive sensor (e.g., a SPAD sensor) is employed, each pixel records up to one photon per frame (i.e., per exposure). Within a single frame, multiple pulses may occur, to increase the probability of measuring one photon. For each new frame, depth and reflectance may be reconstructed, based on a window of most recent frames.

We sometimes call this window of most recent frames the "reconstruction window". This reconstruction window may be set by software. For each new frame, the frames in the reconstruction window may be used to reconstruct depth and reflectance from measurements taken by a single-photon-sensitive sensor (e.g., a SPAD sensor). The number of photons counted in a reconstruction window tends to increase as the number of frames in (and thus the duration of) the reconstruction window increases.

In some cases, the number of frames in (and thus the duration of) the reconstruction window is fixed by software. This fixed window may be employed for all pixels and for all time periods during an imaging of a target object. For instance, in a prototype of this invention, for each new SPAD frame, depth and reflectance are reconstructed based on a fixed window of the most recent 20,000 frames. Note that the duration of the reconstruction window may be much longer than the duration of a single frame (single exposure time). For instance, in the same prototype, the exposure time of a single frame is 100 microseconds and is fixed by hardware of a SPAD sensor, whereas the reconstruction window is fixed by software and consists of 20,000 frames.

In some cases, a fixed number of frames are used for every reconstruction window for every pixel, in order to reconstruct reflectance and depth for that pixel.

Alternatively, in some cases where a single-photon-sensitive sensor (e.g., a SPAD sensor) is employed, software adaptively adjusts the number of frames in (and thus the duration of) the reconstruction window, on a pixelwise or local area basis.

There are advantages to adaptively adjusting the number of frames in the reconstruction window, on a pixelwise or local area basis. This is because the minimum number of frames (which affects the number of photons counted) needed to achieve acceptable accuracy in the reconstruction for a pixel varies, depending on the fog level (lighter fog requires less frames, heavier fog requires more frames). The fog level may vary not only globally but also, if the fog is heterogeneous, from one region of the fog to another.

Adaptively varying the number of frames in the reconstruction window may shorten the effective acquisition time.

In this adaptive process, an initial step is to use photon measurements from a pixel's local area to fit a local Gamma distribution for the pixel (or for a local area of pixels). A pixel's local area may comprise the given pixel and multiple pixels that are neighbors of, or within a specified distance from, the given pixel. Using photon measurements from multiple pixels in a local area provides more photons per Gamma distribution estimate at a shorter effective acquisition time (i.e., in a shorter reconstruction window).

The local Gamma distribution parameters (i.e., local rate and shape parameters) estimated in the prior step may encode the local scattering mean free path of the fog, and thus encode the local fog density. Based on the local Gamma distribution parameters, the minimal number of frames to be included in the reconstruction window may be calculated on a per pixel basis (or for a local area).

This adaptive approach may adapt the number of frames in the reconstruction window (and thus the effective acquisition time) to different levels of fog while trying to minimize it on a local basis or on a pixelwise basis.

In some cases, the above approach is not used to set the reconstruction window for the initial step. This is because, before photons are counted in the initial step, there is not yet any information regarding local Gamma distribution and local fog density which can be used to set the number of frames in the reconstruction window. This raises the question: how to set the number of frames in the reconstruction window for the initial step. The number of frames in the reconstruction window for the initial step may be set at a relatively high number that is sufficient to handle even a dense fog. Alternatively: (a) the number of frames in the reconstruction window for the initial step may be set at a lower number; and (b) based on photons counted in this lower number of frames, both local KDE and local Gamma parameters may be calculated. If the local KDE and local Gamma parameters closely match, then this lower number of frames in the reconstruction window is sufficient. If not, then the process may be iterated, increasing the number of frames in the reconstruction window in each iteration, until the local KDE and local Gamma parameters closely match.

Figure 4:
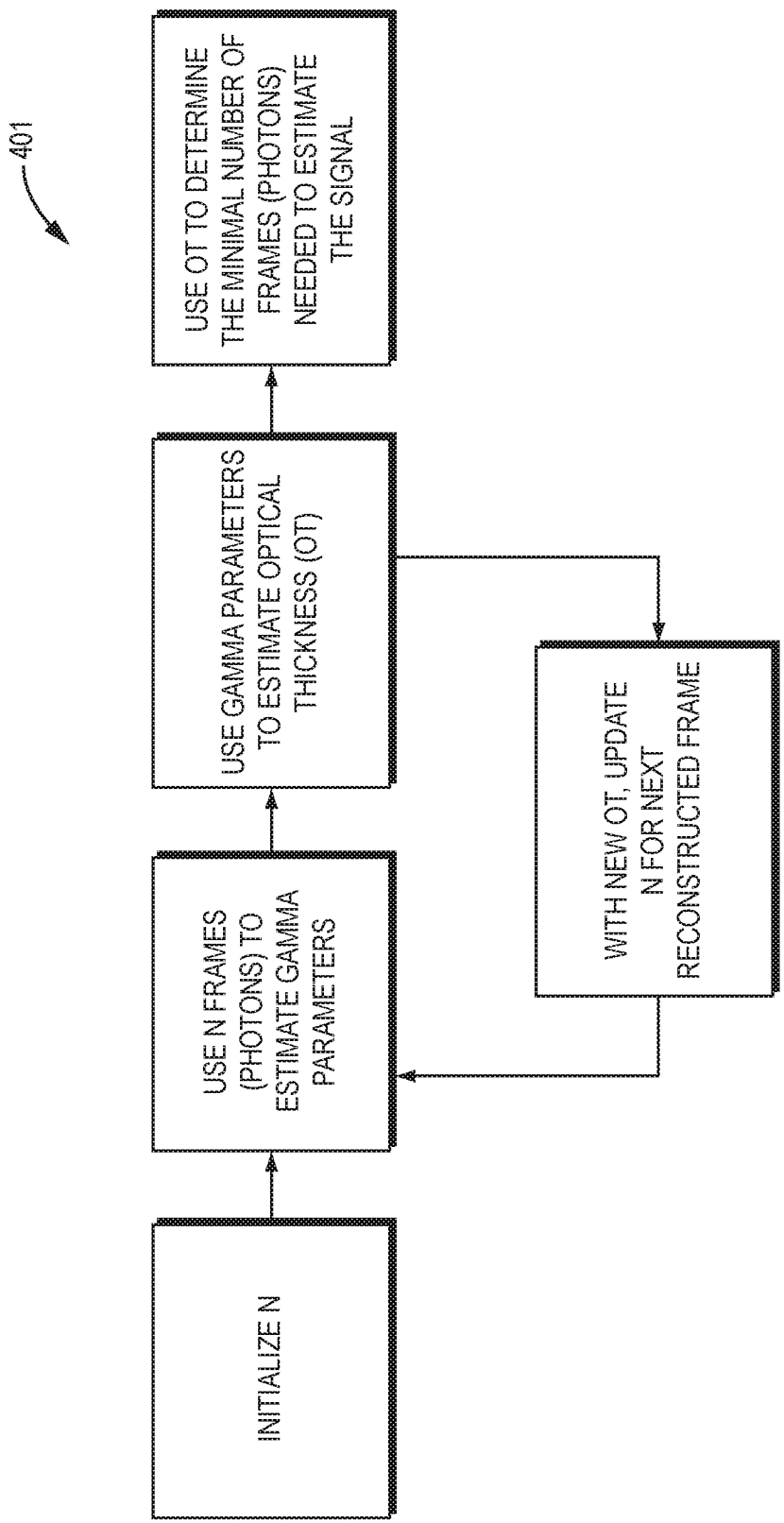
FIG. 4 is a flowchart of a method for adjusting the number of frames.

FIG. 4 is a flowchart of a method 401 for dynamically varying the effective acquisition time, by adjusting the number of frames. In FIG. 4, the method includes estimating the optical thickness (OT) of fog. The method in FIG. 4 may be performed on a per pixel basis (pixelwise). Alternatively, the method in FIG. 4 may be performed on a local basis (e.g., pixel region-by-pixel region, each region separately).

This invention is not limited to using software to adjust the number of frames in a reconstruction window. Alternatively, or in addition, the hardware's exposure time (duration of a frame) may be adjusted, on a pixelwise or local pixel area basis, based on local fog density. A computer may estimate local Gamma parameters (which are a proxy for local fog density) and based on these local Gamma parameters, may control hardware in such a way as to adjust the hardware's exposure time on a pixelwise or local pixel area basis.

As discussed below, in some cases, the imaging sensor is not single-photon sensitive. In some cases: (a) the imaging sensor is not single-photon sensitive (e.g., is a APD that is not a SPAD); (b) for each new frame, reconstruction of depth and reflectance is based on only that new frame (rather than on a window of many recent frames); and (c) a computer calculates local Gamma parameters and adaptively adjusts hardware's exposure time on a pixelwise or local-area-basis, based on the local Gamma parameters.

Sensor That Is Not Single-Photon-Sensitive

In a prototype of this invention, the sensor is single photon sensitive. Specifically, the prototype employs a SPAD (single photon avalanche diode) array with 32×32 pixels. In this prototype, the algorithm to recover the hidden scene on a per-pixel basis comprises five steps:

(a) Estimation of the measured time profile $f_T(t)$. This is achieved with a KDE (kernel density estimator) operating on the individual photon counts.

(b) Estimation of the Gamma distribution $f_T(t|B)$. This is achieved with a maximum likelihood (ML) estimator operating on the individual photon counts.

(c) Estimation of the signal distribution $f_T(t|S)$. This is achieved by the approximation $f_T(t|S) \sim f_T(t) - f_T(t|B)$ followed by a Gaussian fit.

(d) Estimation of the prior probabilities P(B), P(S). This is achieved by solving the linear system $f_T(t) = P(B)f_T(t|B) + P(S)f_T(t|S)$ (e) Estimation of the target depth and reflectance from $P(S)f_T(t|S)$.

The only steps in the above algorithm which require the individual photon counts are (a) and (b). These steps may be accomplished without single photon counts readings. For instance, steps (a) and (b) may instead be achieved by using a conventional time-resolved light detector such as an avalanche photo diode (APD) along with a high speed sampling hardware as follows: (a) With a APD and high speed sampling hardware the time resolved measurement m(t) is directly $f_T(t)$. In some cases, simple denoising is performed on the time resolved measurement m(t). (b) The Gamma fit may be performed using a traditional curve fitting software that finds the solution that minimizes the error between the measurement and the fitted curve. This may be achieved with traditional least squares or more robust algorithms.

The remaining steps (c), (d) and (e) in the above algorithm do not require individual photon counts and may be performed as set forth in the above algorithm.

In some cases in which an APD is employed (instead of a single photon sensor such as a SPAD array), the APD is fast (short rise and fall time) and the sampling hardware has a fast time resolution, high throughput and high bit rate.

Figure 5:
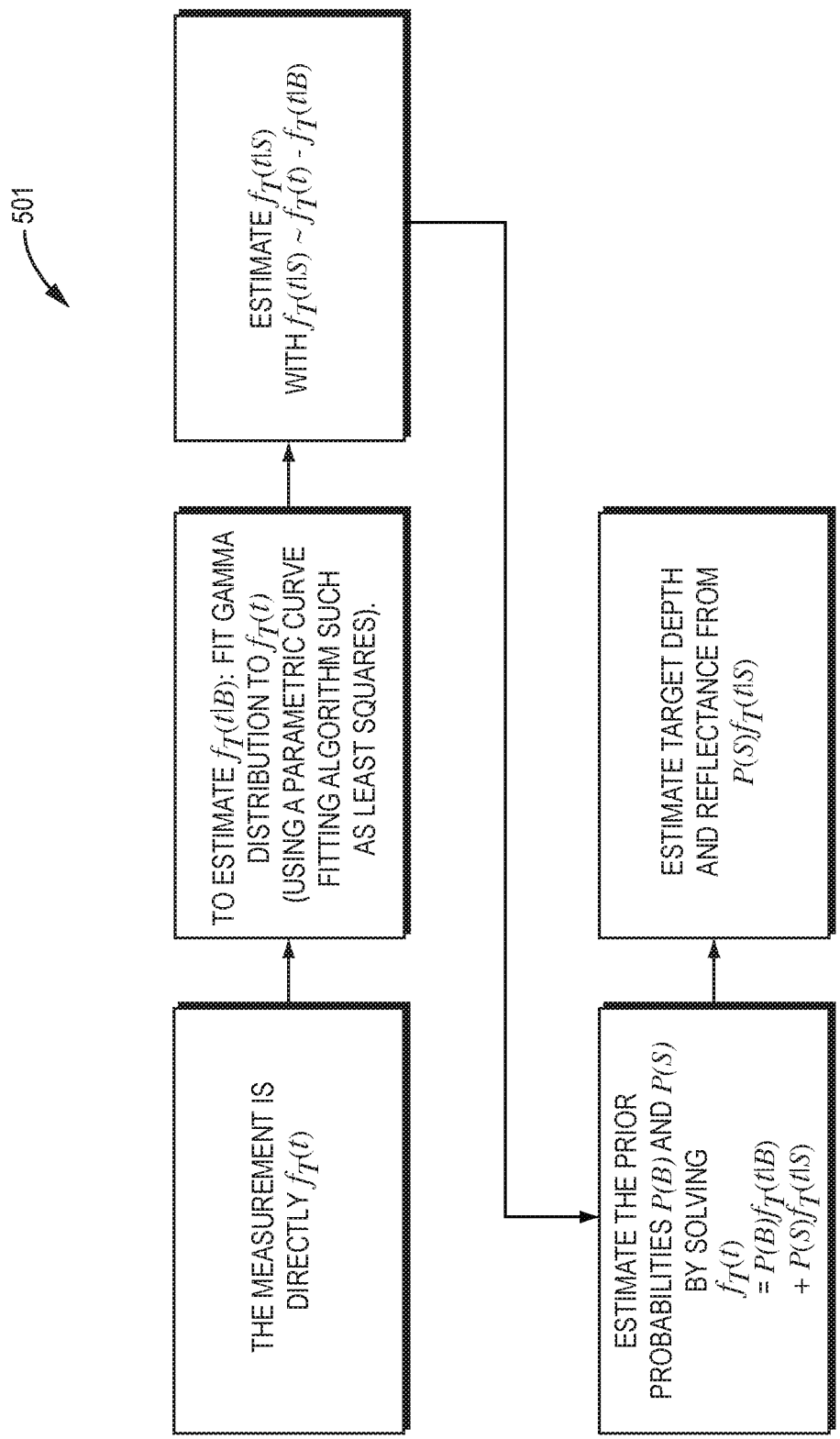

FIG. 5 is a flowchart of a method 501 of imaging reflected light from a foggy scene. In FIG. 5, the light sensor is not single-photon-sensitive For instance, the light sensor may comprise an APD array with high speed sampling hardware.

This invention is not limited to APDs and SPADs. Alternatively, any time-resolved sensor may be employed.

Regularization

In some cases, the computational pipeline: (a) is pixelwise from end-to-end; and thus (b) does not—when estimating fog (Gramma distribution) and recovering the target—leverage spatial correlations that exist in the scene.

However, spatial correlations typically exist in the scene. For instance, the fog properties K, $\mu_s$ typically approximate a smooth (or at least piecewise smooth) function of spatial position. Likewise, the scene depth and reflectance typically approximate a piecewise smooth function of spatial position.

In some implementations, spatial correlations in the scene are priors that are used to improve reconstruction quality.

In some implementations, regularization (which leverages spatial correlations in the scene) is performed.

For example, in some cases, regularization is performed while estimating the Gamma distribution. The Gamma distribution is parametrized by two parameters (i.e., by K and $\mu_s$, which are the shape and rate parameters, respectively).

There are at least two ways to spatially regularize the estimation of the Gamma distribution: These two ways are (1) as an additional step or (2) as part of the estimation process.

(1) As an additional step: After the Gamma distribution parameters are estimated for all pixels, an additional step may be added, in which spatial regularization is performed on the individual parameters.

For instance, this additional step may involve denoising with a total variation prior (assuming the parameters are piece-wise smooth). In some cases, a total variation denoiser is employed. Such a denoiser may operate on an input image $I_{noisy}$ and solve the following optimization problem:

$$\hat{I} = \arg\min_I \sum_{m,n} \sqrt{I_x^2(m,n) + I_y^2(m,n)} + \lambda \|I_{noisy} - I\|_2^2 \quad \text{(Eq. 1.12)}$$

where λ is a constant that is a weight, $I_x$ and $I_y$ are partial derivatives along the x and y axes respectively, and I is the image being denoised.

Here, the $l_1$ formulation produces more piecewise smooth results. Alternatively, the $l_2$ formulation may be employed. The denoiser may be applied on the spatial recovery of K, $\mu_s$, $\mu$, $\sigma^2$, $P_S$, and $P_B$.

(2) As part of the estimation process: The Gamma distribution fit (whether it is done on individual photon counts or on the complete measurement curve) may include another term in the optimization procedure that enforces the desired spatial correlations.

For example, in some cases, in which the solution is based on the complete measurement curve, the parameters of the Gamma distribution may be calculated as:

$$\mu_s, K = \arg\min \|f_T(t) - f_T(t|\mu_s, K, B)\|_2^2 + \lambda_1 \|\mu_s\|_{TV} + \lambda_2 \|K\|_{TV} \quad (Eq.\ 1.13)$$

where: (a) t is time of arrival; (b) $\lambda_1$ and $\lambda_2$ are constants that are weights; (c) K and $\mu_s$ are the shape and rate parameters, respectively, of the Gamma distribution, (d) the arg min term achieves a fit to the Gamma curve; and (e) the two $\|\bullet\|_{TV}$ terms enforce the spatial correlations. In Equations 1.13 and 1.14, each of the mathematical terms are a function of x, y pixel position.

In some cases, spatial regularization is performed during recovery of the scene reflectance and depth. For instance, this may be achieved with a total variation prior (piece-wise smooth scene). This spatial regularization may be applied to (a) the recovered scene reflectance; (b) the recovered depth, or (c) both.

Any combination of one or more of the above regularization methods may be employed in the end-to-end pipeline that estimates fog and recovers depth and reflectance.

In some cases, spatial regularization is performed on six model parameters jointly, as follows:

$$\mu_s, K, \mu, \sigma^2, P_S, P_B = \arg\min \|f_T(t) - P_S f_T(t|\mu, \sigma^2, S) - P_B f_T(t|\mu_s, K, B)\|_2^2 + \lambda_1 \|\mu_s\|_{TV} + \lambda_2 \|K\|_{TV} + \lambda_3 \|\mu\|_{TV} + \lambda_4 \|\sigma^2\|_{TV} + \lambda_5 \|P_S\|_{TV} + \lambda_6 \|P_B\|_{TV} \quad (Eq.\ 1.14)$$

where: (a) $\mu$ is the mean of the Gaussian distribution of measured times of arrival of signal photons; (b) $\sigma^2$ is the variance of that Gaussian distribution; (c) $\lambda_1$, $\lambda_2$, $\lambda_3$, $\lambda_4$, $\lambda_5$, $\lambda_2$, $\lambda_6$ are constants that are weights; (d) $P_S$ is the probability that a photon is a signal photon; (e) $P_B$ is the probability that a photon is a background photon; (f) the six $\|\bullet\|_{TV}$ terms enforce the spatial correlations; and (g) the other terms have same meaning as in Equation 1.13.

The above regularization steps may be performed together or separately. Any combination of one or more of the above regularization methods may be employed in an end-to-end algorithm that estimates fog and recovers depth and reflectance.

Figure 6:
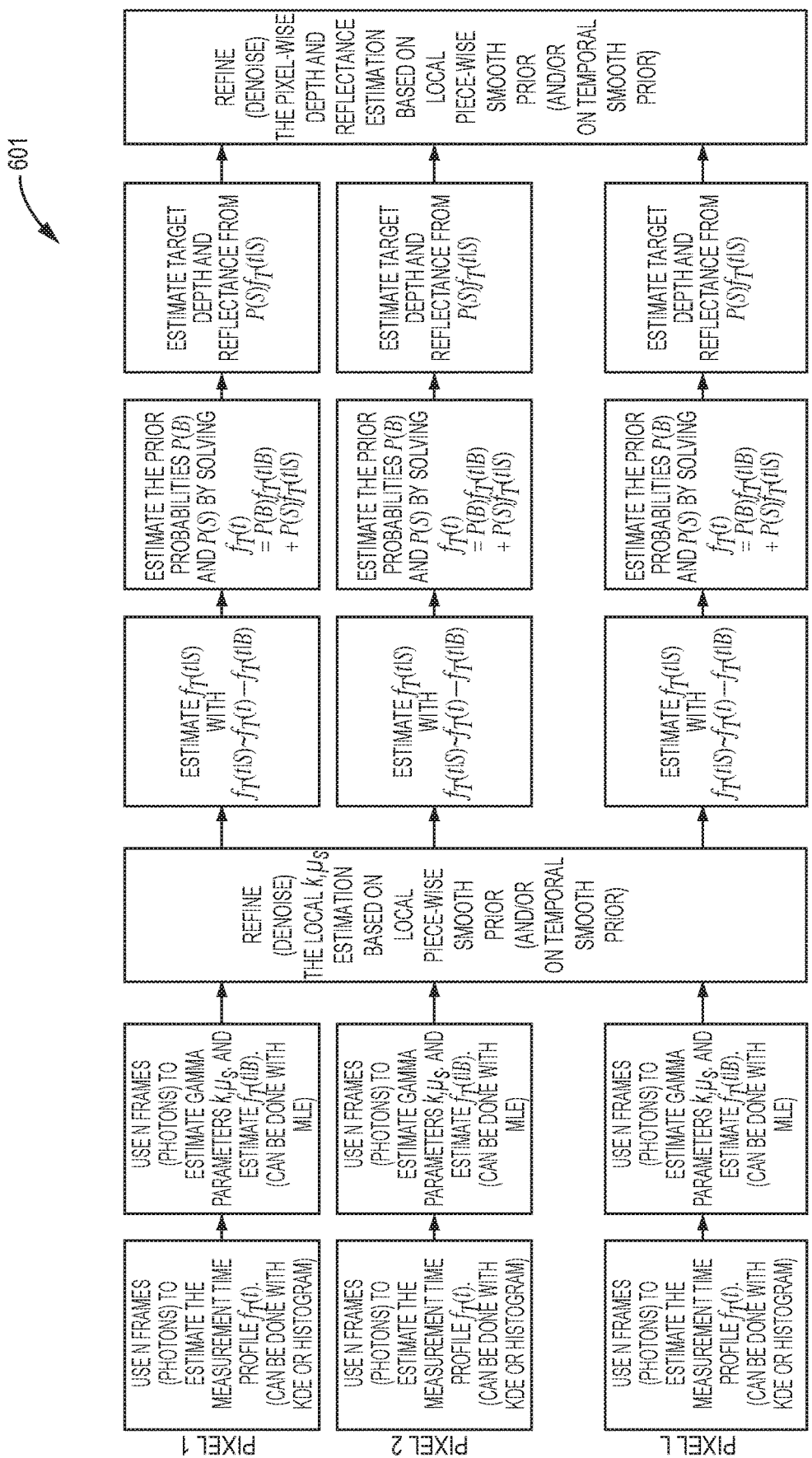

FIG. 6 is a flowchart of a method 601 of imaging reflected light from a foggy scene. In FIG. 6, the method includes regularization steps.

In FIG. 6, the local piecewise smooth priors may be spatial priors or temporal priors. For instance, spatial regularization may be performed with local piecewise smooth spatial priors. The spatial regularization may leverage the fact that Gamma distribution parameters (e.g., K, $\mu_s$) in a local spatial region of pixels are typically smooth. Alternatively, or in addition, temporal regularization may be performed with local piecewise smooth temporal priors. The temporal regularization may leverage the fact that Gamma distribution parameters (e.g., K, $\mu_s$) from one time stamp to the next time stamp are typically pixelwise smooth. In some cases, the time steps for the temporal correlation are seconds or tenths of seconds, whereas the imaging sensor may have a time resolution (for detecting time of arrival of photons) in the picosecond or nanosecond range.

Raster Scan

In some implementations of this invention, an array of pixels measures reflected light from a foggy scene.

Alternatively, a raster scan may be employed to measure the reflected light from the foggy scene. For instance, a scanning LIDAR (light detection and ranging) system may perform the raster scan. The scanning LIDAR system may include one or more pulsed light sources and one or more time-resolved light sensors. The scanning LIDAR system may raster scan the foggy scene. During the raster scan, the reflected light may be steered by changing the orientation of one or more mirrors relative to the light source, foggy scene and/or light detectors. The raster scan may be performed to create a full 3D map of the environment.

The raster scan may be performed with a single-photon-sensitive light detector or by a non-single-photon-sensitive light detector.

In some cases, the raster scan is well-suited for a pixel-wise or local pixel area processing.

Deblurring

In illustrative implementations of this invention, many photons scatter while traveling between the target and the light detector. This scattering may cause blurring in reconstruction of scenes (the denser the fog, the greater the blurring).

To overcome this problem, deblurring may be performed.

In many implementations, the computations tend to separate between back-reflectance from the fog and the signal from the target and thus may deblur to some extent.

Once the signal from the target is estimated, it may be further deblurred. For instance, a blind deconvolution problem may be solved, in which a blur kernel is estimated from the estimated signal. In this approach: (a) a blur kernel may be estimated by leveraging the time resolved measurements; (b) each frame in time may represent a different spatial blur; (c) the different blur kernels in time are estimated from the estimated signal; and (d) once the blur kernel is estimated, the deconvolution is solved (e.g., with two-step iterative shrinkage/thresholding (TwIST) or fast iterative soft thresholding (FISTA)).

The following ten paragraphs describe a non-limiting example of deblurring, in an illustrative implementation of this invention.

In this deblurring example, each target depth plane is deblurred separately. To that end, a depth map of the scene is estimated separately for each target plane z, in a manner described elsewhere herein. To deblur the signal of target plane z, a forward model for time-resolved volumetric light scattering may be employed. This forward model may be the space-time estimated signal $s_z(x, y, t) = f_T(t|S)P_S$ which is a function of the hidden scene $\rho_z(x, y)$. Selecting only pixels that correspond to the current target plane z, this function is:

$$s_z(x, y, t) = \alpha W_z(x, y, t) * \rho_z(x, y) \quad (Eq.\ 2.1)$$

where α is an intensity scaling factor, $W_z(x, y, t)$ is a scattering kernel and '*' denotes convolution over (x, y).

In this deblurring example, the kernel $W_z$ blurs the signal in a time variant manner, in such a way that the temporal information enables an increase in measurement diversity (each frame is a different distorted measurement of the target) and recover the hidden scene. Note that this blur kernel is different for each target depth plane.

In this deblurring example, the optical path of each photon is a realization of a random walk process. The forward model captures the mean of this random walk over a large number of photons. Let the kernel $W_z(x, y, t)$ be the probability density function of measuring a photon at position (x, y) and time t. In this deblurring example, let $G_z(t)$ be the probability density function of measuring a photon at time t independent of its location. Let $H_z(x, y|t)$ be the probability density function of measuring the photon at position (x, y) given the time t. Using this probabilistic formulation the kernel may be decomposed to:

$$W_z(x, y, t) = G_z(t) H_z(x, y|t) \quad \text{(Eq. 2.2)}$$

In this deblurring example, $H_z(x, y|t)$: (a) is a probability density function; (b) may be normalized to 1; and (c) has a normalization factor that depends on t. For simplicity in our derivation, we absorb that factor in $G_z(t)$. $H_z(x, y|t)$ is a time-dependent scattering kernel:

$$H_z(x, y|t) = \exp\left\{-\frac{x^2 + y^2}{4D_z(t - t_{0_z})}\right\} \quad \text{(Eq. 2.3)}$$

where, $D_z$ is the diffusion coefficient, and $t_{0_z}$ accounts for time shift due to the distance to the target.

In this deblurring example, the deblurring method is calibration free, and estimates $G_z(t)$, $D_z$ and $t_{0_z}$ directly from the raw measurements as discussed below. Since $G_z(t)$ is estimated from the measurement itself, it captures information about all photon transmission modalities (ballistic and diffused), independent of their statistical model.

In this deblurring example, an initial step in the reconstruction flow is to estimate the probability function $G_z(t)$. A search is performed over (x, y) for the point in space $(x_0, y_0)$ with the strongest signal. The strongest signal is used as $G_z(t)$, that is, $G_z(t) = s_z(x_0, y_0, t)$. Note that $G_z(t)$ does not contain any spatial information and so it is not a part of the reconstruction process. The measurement is normalized such that:

$$\tilde{s}_z(x, y, t) = \frac{1}{G_z(t)} s_z(x, y, t).$$

Next, estimate $D_z$. When comparing two frames from time points $t_1$ and $t_2$, if $t_2 > t_1$:

$$\tilde{s}_z(x, y, t_2) = \exp\left\{-\frac{x^2 + y^2}{4D_z(t_2 - t_1)}\right\} * \tilde{s}_z(x, y, t_1) \quad \text{(Eq. 2.4)}$$

which is independent of $t_{0_z}$.

This in turn enables performing a line search and fitting $D_z$ to the experimental measurement.

In this deblurring example, to estimate $t_{0_z}$, a search may be performed for the first frame with signal above the noise floor. The result is an empirical estimate for $H_z(x, y|t)$.

In this deblurring example, in order to complete the inversion process, $H_z(x, y|t)$ may be utilized as an empirical forward model, and the expected measurement $\tilde{s}_z(x, y, t)$ may be computed for a point source in any position on the hidden scene plain. These computed measurements are lexicography ordered and stacked into a matrix A such that each column in A is the expected measurement for a specific point source location. In this deblurring example, a goal is to calculate the hidden scene $\rho_z(x, y)$ from the normalized spatio-temporal measurement $\tilde{s}_z$ by solving $A\overline{\rho}_z = \overline{\tilde{s}}_z$, where A captures the forward model which is a mapping from spatial coordinates to spatio-temporal coordinates, and $\overline{\rho}_z$, $\overline{\tilde{s}}_z$ are the lexicographic vectorized versions of $\rho_z$, $\tilde{s}_z$. (In this deblurring example, a horizontal bar above a term may indicate that the term is a vector.) Note that A is a blurring operator (both in space and time) and thus non-invertible. Thus, the inversion problem may be translated into an optimization framework, and a total variation regularizer may be added:

$$\rho_z = \text{argmin}_{\overline{\rho}_z}\{\|A\overline{\rho}_z - \overline{\tilde{s}}_z\|_2^2 + \lambda \|\rho_z\|_{TV}\} \quad \text{(Eq. 2.5)}$$

where $\lambda$ is the regularization parameter.

In this deblurring example, two-step iterative shrinkage/thresholding (TwIST) may be employed to to solve the optimization problem The TwIST algorithm may be initialized with the estimated blurry estimated reflectance; to help the algorithm quickly converge to the solution. The inputs to the TwIST algorithm are the forward operator as defined by Equation 2.3 (after evaluating the model parameters, i.e. the matrix A), the normalized measurement $\tilde{s}_z$ (i.e. the full normalized spatio-temporal profile), and an initialization image (which may be the estimated blurry reflectance).

The deblurring example in the preceding ten paragraphs is a non-limiting example of deblurring, in an illustrative implementation of this invention. In some cases, this deblurring method is not employed. In some cases, this deblurring approach is employed in addition to, or instead of, one or more other deblurring methods discussed herein.

Alternatively, to account for the fact that the blur kernel $W_z(x, y, t)$ is a result of the fog (the same physical process that generates the background photons), the following equation may be used to estimate blur kernel $W_z(x, y, t)$:

$$f_T(t; x, y) = \sum_z W_z(x, y, t) * [\rho_z(x, y) + \beta_z(x, y)] \quad \text{(Eq. 2.6)}$$

where $\beta_z$ is the fog reflectivity (background term).

In Equation 2.6, note that $$\sum_z W_z(x, y, t) * \beta_z(x, y)$$

is equivalent to the background term.

Figure 7:
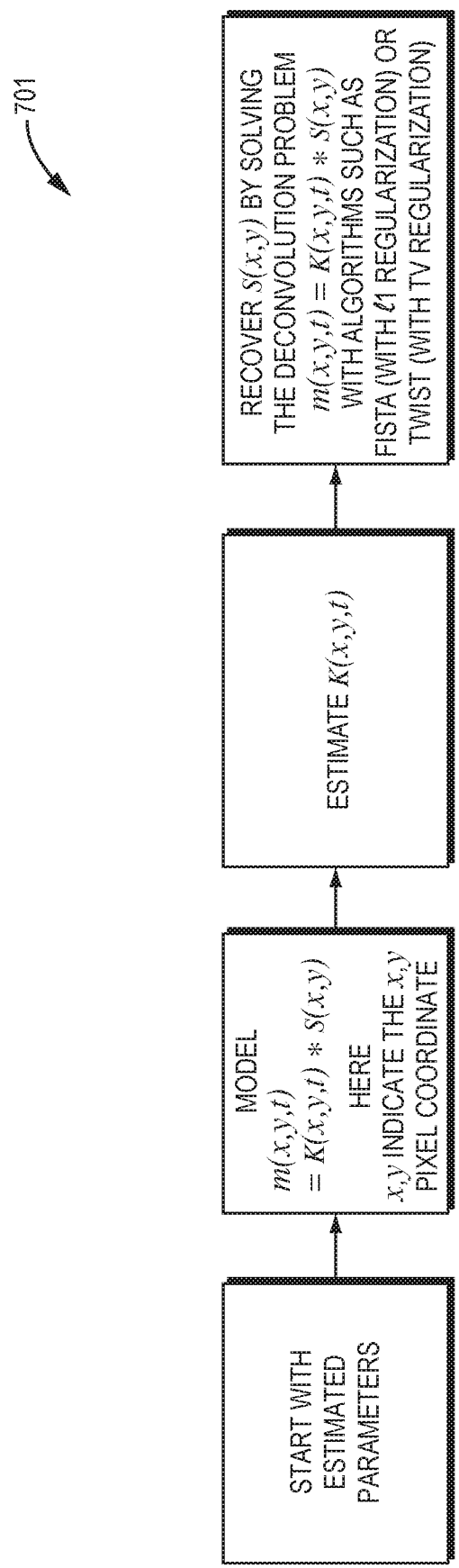
FIG. 7 is a flowchart of deblurring steps.

FIG. 7 is a flowchart of deblurring steps. The deblurring method 701 shown in FIG. 7 may implemented separately for different scene depths.

Leveraging Spatial and Temporal Statistics, Generally

As noted above, in some cases this invention leverages spatial or temporal statistics, when calculating reflectance and depth of a target object that is being imaged. These spatial or temporal statistics may describe or be affected by piecewise spatial (or temporal) smoothness of parameters of the target or the fog. For instance, these parameters (which are spatially and temporally piecewise smooth) may include: (a) rate and shape parameters of a Gamma distribution of times of arrival of background photons; (b) rate and shape parameters of a Gamma distribution of flux or irradiance as a function of time of background photons; (c) reflectance of the target object; and (d) depth of the target object.

For instance, to leverage spatial or temporal statistics, at least some of the computations may model or enforce piecewise smoothness of one or more of (A) a shape parameter of the Gamma distribution, (B) a rate parameter of the Gamma distribution, (C) depth of the target, (D) reflectance of the target, (E) probability that a photon is a background photon, (F) probability that a photon is a signal photon, or (F) a ratio (or a number that is indicative of a ratio) between number of signal photons and number of background photons. These computations (which model or enforce piecewise smoothness) may be all or part of the calculations that estimate a Gamma distribution, a total distribution, a Gaussian distribution, depth or reflectance.

Pixelwise vs Local Area

In some implementations of this invention, the measurements and each of the computational steps are performed in a purely pixelwise manner, so that the reconstruction of each individual pixel is entirely separate from, and does not leverage any information regarding, any other pixel.

Alternatively, in some cases, one or more computational steps (e.g., steps involving regularization, deblurring, or adjusting frame rate) are performed on local basis. Put differently, a computational step may be performed separately for each local region of pixels, on a local region-by-local region basis.

In some cases, a local region of pixels comprises (a) a pixel that is at the center of the local region and (b) multiple pixels that are within a specified distance (e.g., a Euclidian or $l_1$ distance) from the central pixel.

In some cases, the local regions do not overlap. In other cases (e.g., with a sliding window), the local regions overlap.

In some cases, one or more values are computed for an entire local region. For instance, in the adaptive acquisition time approach (described above), a local Gamma distribution may be determined for an entire local region. Or, for instance, optical thickness may be calculated for an entire local region.

In some cases, a calculation (a) takes, as inputs, one or more values for each of the pixels respectively in a local region, and (b) outputs one or more values for only a single pixel in the region. For instance: (a), a sliding window may include all pixels within a specified distance from a central pixel; (b) a value may be computed for a first pixel that is then at the center of the window, based on measurements by all of the pixels that are then in the window; (c) the window may move over one pixel, so that the window is centered on a second pixel that is adjacent to the first pixel; and (d) a value may be computed for the second pixel, based on measurements by all of the pixels that are then in the window.

In some cases, a calculation (a) takes, as inputs, one or more values for each of the pixels respectively in the particular local region, and (b) outputs one or more values for only a subset of pixels in the region.

Each of the computational steps described herein may be performed in a purely pixelwise manner or may be performed on a region-by-region basis.

Expectation Maximization Algorithm

In some implementations, one or more methods described above may be performed to calculate as estimate of model parameters (e.g., an estimate of one or more of $\mu_s$, K, $\mu$, $\sigma^2$, $P_S$, $P_B$, $f_T(t|S)$, $f_T(t|B)$ and $f_T(t)$). For instance, the following subtraction: $f_T(t|S) \approx f_T(t) - f_T(t|B)$ may be performed as part of estimating the model parameters.

One or more of these estimated parameters may be employed as an initializer to an expectation maximization (EM) algorithm. The EM algorithm may refine these initial estimates.

In some implementations, EM has at least two advantages: (a) EM is well-suited for splitting data to two distributions, while having to estimate the parameters of these distributions; and (b) the estimated model parameters may comprise excellent initializer values in the EM algorithm.

In some implementations of this invention, the EM algorithm comprises two steps: (a) an expectation step and (b) a maximization step, In the expectation step, the EM algorithm may, based on the parameters of the distributions, calculate the probabilities for a photon to belong to each class (membership probabilities). In the maximization step, the EM algorithm may, based on the membership probabilities, calculate the distributions' parameters while taking into account the membership probabilities as weights.

In some implementations of this invention: (a) the estimated parameters are used as initializer to the EM algorithm, as described above, and then (b) 500 iterations of the EM algorithm are performed. Due to numerical instability of the algorithm, 5 different restarts of the EM algorithm may be performed. In each restart, the initial values may be slightly perturbed. In some cases, a total of 2500 iterations of the EM algorithm are performed (500 iterations per start times 5 starts). The selected parameters may be chosen based on the iteration that minimized the log-likelihood of the EM algorithm.

Next, the EM algorithm may separate between background and signal photons. To that end, the EM algorithm may evaluate the probability that each photon belongs to the signal or background class:

$$\hat{P}_S \hat{f}_T(x^i | S) \underset{Signal}{\overset{Background}{\lessgtr}} \hat{P}_B \hat{f}_T(x^i | B) \quad \text{(Eq. 3)}$$

In Equation 3: (a) if the expression on the left is larger than the expression on the right, then the photon is classified as a signal photon; and (b) if the expression on the right is larger than the expression on the left, then the photon is classified as a background photon.

The number of classified signal photons $N^s$ may correspond to the target reflectivity at that pixel. The mean of the signal photons may correspond to the target distance at that pixel.

In some implementations of this invention, the EM algorithm is constrained to refine the input without significant deviation from the initial condition.

Structured Light

In some implementations of this invention, one or more light sources (e.g., lasers or LEDs) illuminate the foggy scene with structured illumination. For instance, both an infrared structured illumination pattern and visible (ordinary, unstructured) light may illuminate a target object through a fog. The structured illumination, when employed together with one or more methods described above, may facilitate more accurate reconstruction of reflectance and depth of a target occluded by fog.

Computer Vision Through Fog

In some implementations, one or more methods described above are employed to reconstruct both reflectance and depth of a target that is occluded by fog. The resulting pixelwise reflectance image (loosely speaking, a photograph): (a) may appear as if it were taken while fog is absent; and (b) may be fed as an input to computer vision ("CV") algorithm. The CV algorithm may recognize text or other objects in the fog. The CV algorithm may have been trained on images that were taken while fog was absent. Thus, the data sensitive part of the computer vision algorithm may be trained without fog, and when integrated with the present invention, may work accurately in foggy scenarios.

For instance, in some cases: (a) measurements are taken of light reflecting from a target object that is occluded by fog; (b) based on these measurements, an image of the target is reconstructed that appears as if it were acquired when fog was absent; and (c) an OCR (optical character recognition) algorithm may recognize, in the reconstructed image, text that is displayed on the target object. For example, if the target object is a street sign, then the OCR may recognize text (e.g., words or numbers) that are written on the street sign.

In some cases, only the reconstructed reflectance image (loosely speaking, photo) is an input to the computer vision algorithm. Alternatively, in other cases, both the reconstructed reflectance image (loosely speaking, photo) and reconstructed depth map are inputs to the computer vision algorithm.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an imaging system, including any camera (e.g., APD camera or SPAD camera) or any active light source (e.g., a laser); (2) to perform a pixelwise probabilistic algorithm that computationally separates background reflection and reflection from a target and that calculates reflectance and depth of a target; (3) to dynamically adjust acquisition time or frame rate; (4) to perform regularization or deblurring; (5) to receive data from, control, or interface with one or more sensors; (6) to perform any other calculation, computation, program, algorithm, or computer function described or implied herein; (7) to receive signals indicative of human input; (8) to output signals for controlling transducers for outputting information in human perceivable format; (9) to process data, to perform computations, and to execute any algorithm or software; and (10) to control the read or write of data to and from memory devices (tasks 1-10 of this sentence referred to herein as the "Computer Tasks"). The one or more computers (e.g. 109) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 101, 103, 109) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 109) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Actuators

In illustrative implementations, the system includes one or more actuators (e.g., 122). Each actuator (including each actuator for actuating any movement) may be any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"APD" means avalanche photodiode.

"Archimedes' constant" means the ratio of a circle's circumference to its diameter. Archimedes' constant is sometimes called "pi" or "π". Archimedes' constant is an irrational number that is approximately equal to 3.14159.

To compute "based on" specified data means to perform a computation that takes the specified data as an input.

Non-limiting examples of a "camera", as that term is used herein, include: (a) a digital camera; (b) a digital grayscale camera; (c) a digital color camera; (d) a video camera; (e) a SPAD sensor, APD sensor or other time-of-flight camera; (f) a depth camera; and (g) a light sensor. In some cases, a camera includes any computers or circuits that process data captured by the camera.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

As used herein, a vertical (not slanted) line "|" denotes conditional probability. For instance, P(A|B) means the conditional probability of A given B.

"Defined Term" means a term or phrase that is set forth in quotation marks in this Definitions section.

A non-limiting example of "distance" is a Euclidean distance. Another non-limiting example of "distance" is an $l_1$ norm.

For an event to occur "during" a time period, it is not necessary that the event occur throughout the entire time period. For example, an event that occurs during only a portion of a given time period occurs "during" the given time period.

The term "e.g." means for example.

"Effective acquisition time" means duration of a time window, which time window comprises frames that are taken into account when calculating depth or reflectance.

To say that a computation "enforces" X means that X is enforced in the computation itself. To say that a computation "enforces" X does not imply anything regarding enforcement in the physical world.

Each equation above may be referred to herein by the equation number set forth to the right of (or immediately below) the equation. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

The phrase "Gamma distribution" is used herein in the statistical sense.

The phrase "Gaussian distribution" (also known as a normal distribution) is used herein in the statistical sense.

To say a "given" X is simply a way of identifying the X, such that the X may be referred to later with specificity. To say a "given" X does not create any implication regarding X. For example, to say a "given" X does not create any implication that X is a gift, assumption, or known fact.

As used herein, a hat shape (comprising two slanted lines that meet at a peak) over a mathematical term means that the term is estimated. For instance, x̂ is an estimate of x.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any radiometric or photometric measure of intensity, energy or power. Each of the following is a non-limiting example of "intensity" of light: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, luminance, luminous intensity, luminous energy, luminous flux, luminous power, illuminance, luminous exitance, luminous emittance, luminous exposure, and luminous energy density.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

In the context of a camera, the "optical density" of fog during a temporal period means −log $$\left(\frac{P_f}{P_0}\right),$$

where $P_0$ is power of light measured by the camera without the fog and $P_f$ is power of light measured by the camera during the temporal period with the fog present.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

To say that x is "much smaller" than y means that x<0.5 y.

A parenthesis is simply to make text easier to read, by indicating a grouping of words. A parenthesis does not mean that the parenthetical material is optional or may be ignored.

"Pixel region" means a region that includes multiple pixels. A non-limiting example of a "pixel region" is group of multiple pixels in an image, which multiple pixels are based on measurements taken by only a single hardware pixel during a raster scan.

"Pixelwise" means pixel-by-pixel.

"PSNR" means peak signal-to-noise ratio.

The ratio X:Y is a ratio "between" X and Y. Also, the ratio Y:X is a ratio "between" X and Y.

A non-limiting example of a photon that "reflects from the target" is a photon that reflects from the target and then travels straight to the camera without any scattering. Another non-limiting example of a photon that "reflects from the target" is a photon that reflects from the target and then scatters one or more times before reaching the camera.

To say that a step is performed on a "region-by-region basis" means that the step is performed for different pixel regions, respectively, in such a way that (a) the step is performed separately for each pixel region, and (b) each pixel region comprises multiple pixels. In a non-limiting example of performing a step on a "region-by-region basis", the pixel regions do not overlap. In a non-limiting example of performing a step on a "region-by-region basis", the pixel regions overlap. In a non-limiting example of performing a step on a "region-by-region basis", each particular pixel region comprises pixels that are within a specified distance from a given pixel. In a non-limiting example of performing a step on a "region-by-region basis", for each particular pixel region, a calculation (a) takes, as inputs, one or more values for each of the pixels respectively in the particular region, and (b) outputs one or more values for only a single pixel in the particular region. In a non-limiting example of performing a step on a "region-by-region basis", for each particular pixel region, a calculation (a) takes, as inputs, one or more values for each of the pixels respectively in the particular region, and (b) outputs one or more values for only a subset of pixels in the particular region.

As used herein, the term "set" does not include a group with no elements.

Non-limiting examples of "solving" an equation include solving the equation in closed form or by numerical approximation or by optimization.

Unless the context clearly indicates otherwise, "some" means one or more.

"SPAD" means single-photon avalanche diode.

"SSIM index" means structural similarity index.

As used herein, a "subset" of a set consists of less than all of the elements of the set.

The term "such as" means for example.

As used herein, "times of arrival of photons" means multiple times of arrival, such that: (a) there are multiple photons; and (b) each of the photons, respectively, has only one time of arrival.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) taking measurements of a set of times of arrival of photons that reflect from a foggy scene, which foggy scene comprises fog and a solid target, which photons include signal photons and background photons, and which set includes times of arrival of the signal photons and times of arrival of the background photons; (b) estimating, based on the measurements, an overall distribution, which overall distribution is a probability density function of all of the times of arrival in the set, including the times of arrival of the signal photons and of the background photons; (c) estimating, based on the measurements, a Gamma distribution, which Gamma distribution is a probability density function of the times of arrival of the background photons; (d) calculating a difference equal to the overall distribution minus the Gamma distribution; (e) fitting the difference to a Gaussian distribution to estimate a probability density function of the times of arrival of the signal photons; and (f) calculating, based on the probability density function of the times of arrival of the signal photons, (i) depth of the target and (ii) reflectance of the target; wherein (i) the signal photons are photons that reflect from the target, (ii) the background photons are photons that reflect from the fog without ever reflecting from the target, (iii) one or more computations model or tend to enforce piecewise smoothness of one or more of (A) a shape parameter of the Gamma distribution, (B) a rate parameter of the Gamma distribution, (C) depth of the target, (D) reflectance of the target, (E) probability that a photon is a signal photon, (F) probability that a photon is a background photon, and (G) a ratio between number of signal photons and number of background photons, and (iv) the one or more computations comprise all or part of a group of steps, which group of steps consists of the estimating steps, the calculating steps and the fitting the difference step. In some cases, the method further includes determining, during an iteration in a set of iterations, an effective acquisition time for a particular pixel region, which determining is based on a Gramma distribution for the particular pixel region that was calculated during a prior iteration in the set of iterations. In some cases, the set of one or more computations includes spatial regularization. In some cases, the set of one or more computations includes temporal regularization. In some cases, the taking measurements includes performing a raster scan. In some cases, the set of one or more computations includes a deblurring step, which deblurring step includes solving a blind deconvolution problem. Each of the cases described above in this paragraph is an example of the method described in the first sentence of this paragraph, and is also an example of an embodiment of this invention that may be combined with other embodiments of this invention.

In some implementations, this invention is a method comprising: (a) taking measurements, during multiple time windows, of intensity of light that reflects from a foggy scene, which foggy scene comprises fog and a solid target, and which light includes signal photons and background photons, (b) estimating, based on the measurements, an overall distribution, which overall distribution is a probability density function of total intensity as a function of time, which total intensity is the sum of at least (i) intensity due to signal photons and (ii) intensity due to background photons; (c) estimating, based on the measurements, a Gamma distribution of the intensity due to background photons as a function of time; (d) calculating a difference equal to the overall distribution minus the Gamma distribution; (e) fitting the difference to a Gaussian distribution to estimate the intensity due to the signal photons as a function of time; and (f) calculating, based on the intensity due to signal photons as a function of time, (i) depth of the target and (ii) reflectance of the target; wherein (i) the signal photons are photons that reflect from the target, (ii) the background photons are photons that reflect from the fog without ever reflecting from the target, (iii) one or more computations model or tend to enforce piecewise smoothness of one or more of (A) a shape parameter of the Gamma distribution, (B) a rate parameter of the Gamma distribution, (C) depth of the target, (D) reflectance of the target, (E) probability that a photon is a signal photon, (F) probability that a photon is a background photon, and (G) a ratio between number of signal photons and number of background photons, and (iv) the one or more computations comprise all or part of, a group of steps, which group of steps consists of the estimating steps, the calculating steps and the fitting the difference step. In some cases, the method further includes determining, during an iteration in a set of iterations, an effective acquisition time for a particular pixel region, which determining is based on a Gramma distribution for the particular pixel region that was calculated during a prior iteration in the set of iterations. In some cases: (a) a sensor performs the taking measurements; and (b) the sensor comprises one or more avalanche photodiodes that are not single-photon avalanche diodes. In some cases, the set of one or more computations includes spatial regularization. In some cases, the set of one or more computations includes temporal regularization. In some cases, the taking measurements includes performing a raster scan. In some cases, the set of one or more computations includes a deblurring step, which deblurring step includes solving a blind deconvolution problem. Each of the cases described above in this paragraph is an example of the method described in the first sentence of this paragraph, and is also an example of an embodiment of this invention that may be combined with other embodiments of this invention.

In some implementations, this invention is an apparatus comprising: (a) a light detector; (b) a light source; and (c) one or more computers; wherein (i) the light source is configured to illuminate a foggy scene with pulses of light, which foggy scene comprises fog and a solid target, (ii) the light detector is configured to take measurements of a set of times of arrival of photons that reflect from the foggy scene, which photons include signal photons and background photons, and which set includes times of arrival of the signal photons and times of arrival of the background photons, the signal photons being photons that reflect from the target, and the background photons being photons that reflect from the fog without ever reflecting from the target, (iii) the one or more computers are programmed to perform a group of steps, which group of steps includes (A) estimating, based on the measurements, an overall distribution, which overall distribution is a probability density function of all of the times of arrival in the set, including the times of arrival of the signal photons and of the background photons, (B) estimating, based on the measurements, a Gamma distribution, which Gamma distribution is a probability density function of the times of arrival of the background photons, (C) calculating a difference equal to the overall distribution minus the Gamma distribution, (D) fitting the difference to a Gaussian distribution to estimate a probability density function of the times of arrival of the signal photons, and (E) calculating, based on the probability density function of the times of arrival of the signal photons, (i) depth of the target and (ii) reflectance of the target, (iv) one or more computations model or tend to enforce piecewise smoothness of one or more of (A) a shape parameter of the Gamma distribution, (B) a rate parameter of the Gamma distribution, (C) depth of the target, (D) reflectance of the target, (E) probability that a photon is a signal photon, (F) probability that a photon is a background photon, and (G) a ratio between number of signal photons and number of background photons, and (v) the one or more computations comprise all or part of the group of steps that the one or more computers are programmed to perform. In some cases, the one or more computers are further programmed to calculate, during an iteration in a set of iterations, an effective acquisition time for a particular pixel region, based on a Gramma distribution for the particular pixel region that was calculated during a prior iteration in the set of iterations. In some cases, the light sensor comprises one or more avalanche photodiodes that are not single-photon avalanche diodes. In some cases, the set of one or more computations includes spatial regularization. In some cases, the set of one or more computations includes temporal regularization. In some cases, the set of one or more computations includes a deblurring step, which deblurring step includes solving a blind deconvolution problem. In some cases: (a) the apparatus further comprises at least one mirror and at least one actuator; and (b) the at least one actuator is configured to move the at least one mirror in such a way as to perform a raster scan of a scene while steering reflected light from scene to the light detector. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein. For instance, in some cases, one or more of the following methods are combined with each other and/or with one or more other methods described herein: (a) adaptive acquisition time; (b) sensing with a single-photon-sensitive sensor; (c) sensing with a sensor that is not single-photon-sensitive; (d) regularization; (e) raster scanning; (f) deblurring; (g) structured light; (h) expectation maximization algorithm; (i) pixelwise computations for at least a portion of the computations; (j) local pixel area-by-local pixel area computations for at least a portion of the computations; and (k) OCR or other computer vision.

What is claimed:

1. A method comprising:
   (a) taking measurements of a set of times of arrival of photons that reflect from a foggy scene, which foggy scene comprises fog and a solid target, which photons include signal photons and background photons, and which set includes times of arrival of the signal photons and times of arrival of the background photons;
   (b) estimating, based on the measurements, an overall distribution, which overall distribution is a probability density function of all of the times of arrival in the set, including the times of arrival of the signal photons and of the background photons;
   (c) estimating, based on the measurements, a Gamma distribution, which Gamma distribution is a probability density function of the times of arrival of the background photons;
   (d) calculating a difference equal to the overall distribution minus the Gamma distribution;
   (e) fitting the difference to a Gaussian distribution to estimate a probability density function of the times of arrival of the signal photons; and
   (f) calculating, based on the probability density function of the times of arrival of the signal photons, (i) depth of the target and (ii) reflectance of the target;
   wherein
      (i) the signal photons are photons that reflect from the target,
      (ii) the background photons are photons that reflect from the fog without ever reflecting from the target,
      (iii) one or more computations model, or enforce, piecewise smoothness of one or more of:
         (A) depth of the target,
         (B) reflectance of the target,
         (C) probability that a photon is a signal photon,
         (D) probability that a photon is a background photon, and
         (E) a ratio between number of signal photons and number of background photons, and
      (iv) the one or more computations comprise all or part of a group of steps, which group of steps consists of the estimating steps, the calculating steps and the fitting the difference step.

2. The method of claim 1, wherein the method further includes determining, during an iteration in a set of iterations, an effective acquisition time for a particular pixel region, which determining is based on a Gamma distribution for the particular pixel region that was calculated during a prior iteration in the set of iterations.

3. The method of claim 1, wherein the set of one or more computations includes spatial regularization.

4. The method of claim 1, wherein the set of one or more computations includes temporal regularization.

5. The method of claim 1, wherein the taking measurements includes performing a raster scan.

6. The method of claim 1, wherein the set of one or more computations includes a deblurring step, which deblurring step includes solving a blind deconvolution problem.

7. A method comprising:
   (a) taking measurements, during multiple time windows, of intensity of light that reflects from a foggy scene, which foggy scene comprises fog and a solid target, and which light includes signal photons and background photons;
   (b) estimating, based on the measurements, an overall distribution of total intensity as a function of time, which total intensity is the sum of at least (i) intensity due to signal photons and (ii) intensity due to background photons;
   (c) estimating, based on the measurements, a Gamma distribution of the intensity due to background photons as a function of time;
   (d) calculating a difference equal to the overall distribution minus the Gamma distribution;
   (e) fitting the difference to a Gaussian distribution to estimate the intensity due to the signal photons as a function of time; and
   (f) calculating, based on the intensity due to signal photons as a function of time,
   (i) depth of the target and (ii) reflectance of the target;
   wherein
      (i) the signal photons are photons that reflect from the target,
      (ii) the background photons are photons that reflect from the fog without ever reflecting from the target, (iii) one or more computations model, or enforce, piecewise smoothness of one or more of:
  (A) depth of the target,
  (B) reflectance of the target,
  (C) probability that a photon is a signal photon,
  (D) probability that a photon is a background photon, and
  (E) a ratio between number of signal photons and number of background photons, and
(iv) the set of one or more computations comprise all or part of, a group of steps, which group of steps consists of the estimating steps, the calculating steps and the fitting the difference step.

8. The method of claim 7, wherein the method further includes determining, during an iteration in a set of iterations, an effective acquisition time for a particular pixel region, which determining is based on a Gamma distribution for the particular pixel region that was calculated during a prior iteration in the set of iterations.

9. The method of claim 7, wherein:
(a) a sensor performs the taking measurements; and
(b) the sensor comprises one or more avalanche photodiodes that are not single-photon avalanche diodes.

10. The method of claim 7, wherein the set of one or more computations includes spatial regularization.

11. The method of claim 7, wherein the set of one or more computations includes temporal regularization.

12. The method of claim 7, wherein the taking measurements includes performing a raster scan.

13. The method of claim 7, wherein the set of one or more computations includes a deblurring step, which deblurring step includes solving a blind deconvolution problem.

14. An apparatus comprising:
(a) a light detector;
(b) a light source; and
(c) one or more computers;
wherein
  (i) the light source is configured to illuminate a foggy scene with pulses of light, which foggy scene comprises fog and a solid target,
  (ii) the light detector is configured to take measurements of a set of times of arrival of photons that reflect from the foggy scene, which photons include signal photons and background photons, and which set includes times of arrival of the signal photons and times of arrival of the background photons, the signal photons being photons that reflect from the target, and the background photons being photons that reflect from the fog without ever reflecting from the target,
  (iii) the one or more computers are programmed to perform a group of steps, which group of steps includes
    (A) estimating, based on the measurements, an overall distribution, which overall distribution is a probability density function of all of the times of arrival in the set, including the times of arrival of the signal photons and of the background photons,
    (B) estimating, based on the measurements, a Gamma distribution, which Gamma distribution is a probability density function of the times of arrival of the background photons,
    (C) calculating a difference equal to the overall distribution minus the Gamma distribution,
    (D) fitting the difference to a Gaussian distribution to estimate a probability density function of the times of arrival of the signal photons, and
    (E) calculating, based on the probability density function of the times of arrival of the signal photons, (i) depth of the target and (ii) reflectance of the target,
  (iv) one or more computations model, or enforce, piecewise smoothness of one or more of:
    (A) depth of the target,
    (B) reflectance of the probability that a photon is a background photon, reflectance of the target,
    (C) probability that a photon is a signal photon, and
    (D) a ratio between number of signal photons and number of background photons, and
  (v) the one or more computations comprise all or part of the group of steps that the one or more computers are programmed to perform.

15. The apparatus of claim 14, wherein the one or more computers are further programmed to calculate, during an iteration in a set of iterations, an effective acquisition time for a particular pixel region, based on a Gamma distribution for the particular pixel region that was calculated during a prior iteration in the set of iterations.

16. The apparatus of claim 14, wherein the light sensor comprises one or more avalanche photodiodes that are not single-photon avalanche diodes.

17. The apparatus of claim 14, wherein the set of one or more computations includes spatial regularization.

18. The apparatus of claim 14, wherein the set of one or more computations includes temporal regularization.

19. The apparatus of claim 14, wherein the set of one or more computations includes a deblurring step, which deblurring step includes solving a blind deconvolution problem.

20. The apparatus of claim 14, wherein:
(a) the apparatus further comprises at least one mirror and at least one actuator; and
(b) the at least one actuator is configured to move the at least one mirror in such a way as to perform a raster scan of a scene while steering reflected light from scene to the light detector.

* * * * *